US009135326B2

(12) United States Patent
Tamura et al.

(10) Patent No.: US 9,135,326 B2
(45) Date of Patent: Sep. 15, 2015

(54) TEXT MINING METHOD, TEXT MINING DEVICE AND TEXT MINING PROGRAM

(75) Inventors: Akihiro Tamura, Tokyo (JP); Kai Ishikawa, Tokyo (JP); Shinichi Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 13/511,504

(22) PCT Filed: Dec. 7, 2010

(86) PCT No.: PCT/JP2010/072310
§ 371 (c)(1),
(2), (4) Date: May 23, 2012

(87) PCT Pub. No.: WO2011/071174
PCT Pub. Date: Jun. 16, 2011

(65) Prior Publication Data
US 2012/0284016 A1 Nov. 8, 2012

(30) Foreign Application Priority Data

Dec. 10, 2009 (JP) ................................. 2009-280558

(51) Int. Cl.
*G06F 17/27* (2006.01)
*G06F 17/30* (2006.01)

(52) U.S. Cl.
CPC ................................. *G06F 17/3061* (2013.01)

(58) Field of Classification Search
CPC .............. G06F 17/30; G06F 17/30705; G06F 17/30598; G06F 17/30867
USPC .............................................. 704/9; 707/738
See application file for complete search history.

(56) References Cited

U.S. PATENT DOCUMENTS 5,875,446 A * 2/1999 Brown et al. ........................ 1/1
6,205,456 B1 * 3/2001 Nakao ............................ 715/201
7,181,688 B1 * 2/2007 Umemoto et al. ............. 715/210
(Continued)

FOREIGN PATENT DOCUMENTS

JP 2003-016106 1/2003
JP 2006-031198 2/2006
(Continued)

OTHER PUBLICATIONS

International Search Report PCT/JP2010/072310, dated Jan. 18, 2011, with English Translation.
(Continued)

*Primary Examiner* — Jakieda Jackson
(74) *Attorney, Agent, or Firm* — Young & Thompson

(57) ABSTRACT

Disclosed are a text mining method, device, and program capable of performing text mining with a specific topic as an object with high precision. An element identification unit calculates a feature degree, which is an index for indicating a degree that within a text set of interest, which is a set of text that is to be analyzed, an element of the text appears. An output unit identifies distinctive elements within the text set of interest on the basis of the calculated feature degree and outputs the identified elements. The element identification unit corrects the feature degree on the basis of a topic relatedness degree, which is a value indicating a degree related to a topic of analysis, which is a topic for which each text portion of the text being analyzed has been partitioned into predetermined units that are to be analyzed.

12 Claims, 14 Drawing Sheets

(56) References Cited

U.S. PATENT DOCUMENTS

| | | | |
|---|---|---|---|
| 7,269,546 B2* | 9/2007 | Stensmo | 704/9 |
| 7,769,751 B1* | 8/2010 | Wu et al. | 707/728 |
| 8,201,107 B2* | 6/2012 | Chevalier et al. | 715/861 |
| 2002/0065857 A1* | 5/2002 | Michalewicz et al. | 707/532 |
| 2003/0028512 A1* | 2/2003 | Stensmo | 707/1 |
| 2003/0204496 A1* | 10/2003 | Ray et al. | 707/3 |
| 2004/0128301 A1* | 7/2004 | Thint et al. | 707/101 |
| 2005/0154702 A1* | 7/2005 | Liu et al. | 707/1 |
| 2007/0179946 A1* | 8/2007 | Wissner-Gross | 707/5 |
| 2008/0189633 A1* | 8/2008 | Boyle et al. | 715/764 |
| 2009/0125534 A1* | 5/2009 | Morton et al. | 707/100 |
| 2009/0282038 A1* | 11/2009 | Subotin et al. | 707/6 |
| 2013/0290303 A1* | 10/2013 | Harinarayan et al. | 707/722 |
| 2014/0122493 A1* | 5/2014 | Sifry | 707/738 |

FOREIGN PATENT DOCUMENTS

| | | |
|---|---|---|
| JP | 2007241348 | 9/2007 |
| JP | 2008-146461 | 6/2008 |
| JP | 2008-204274 | 9/2008 |
| JP | 2008-278088 | 11/2008 |

OTHER PUBLICATIONS

Chinese Office Action, dated Mar. 3, 2015, in corresponding Chinese Patent Application No. 2011-545274, with partial English translation.

* cited by examiner

Fig.6

| SPEECH INDEX | SPEECH TEXT |
|---|---|
| 1 | HAI, ABC KOURUSENTA, OO DESU. ("Yes, ABC call center, This is OO.") |
| 2 | OSEWA NI NATTE ORIMASU. ("I really appreciate your kind assistance.") |
| ... | ... |
| 16 | SAIKIDOU SHITE ITADAITE IIDESUKA? ("Would you reboot?") |
| 17 | SHITAKEDO, UGOKANAI DESUNE. ("In spite of having done, it does not move.") |
| 18 | HIDARI KARA NIBAN-ME NO BOTAN WO OSHITE MORATTE II DESUKA? ("Would you push the second button form the left?") |
| 19 | NN, OSHITAKEDO YAPPARI DAME MITAI DESU. ("Uh, though I pushed, it does not.") |
| 20 | DEHA, SHUURINI UKAGAWASETE ITADAKIMASU NODE, RENRAKUSAKI OSHIETE ITADAKE MASUKA. ("Then, since we will visit you for repair, may I have your phone number?") |
| 21 | XX-XXXX-XXXX DESU. ("This is XX-XXXX-XXXX.") |
| ... | ... |

Fig.7

| SPEECH INDEX | SPEECH TEXT | TOPIC | INVOLVEMENT DEGREE |
|---|---|---|---|
| 1 | HAI, ABC KOURUSENTA, OO DESU. ("Yes, ABC call center, This is OO.") | Opening | 0.93 |
| 2 | OSEWA NI NATTE ORIMASU. ("I really appreciate your kind assistance.") | Opening | 0.88 |
| ... | ... | ... | ... |
| 16 | SAIKIDOU SHITE ITADAITE IIDESUKA? ("Would you reboot?") | Procedure | 0.83 |
| 17 | SHITAKEDO, UGOKANAI DESUNE. ("In spite of having done, it does not move.") | Procedure | 0.78 |
| 18 | HIDARI KARA NIBAN-ME NO BOTAN WO OSHITE MORATTE II DESUKA? ("Would you push the second button form the left?") | Procedure | 0.92 |
| 19 | NN, OSHITAKEDO YAPPARI DAME MITAI DESU. ("Uh, though I pushed, it does not.") | Procedure | 0.80 |
| 20 | DEHA, SHUURINI UKAGAWASETE ITADAKIMASU NODE, RENRAKUSAKI OSHIETE ITADAKE MASUKA. ("Then, since we will visit you for repair, may I have your phone number?") | Procedure / Contact Method | 0.42 / 0.35 |
| 21 | XX-XXXX-XXXX DESU. ("This is XX-XXXX-XXXX.") | Contact Method | 0.86 |
| ... | ... | ... | ... |

Fig.8

| SPEECH INDEX | SPEECH TEXT | DEGREE OF INVOLVEMENT WITH "PROCEDURE" |
|---|---|---|
| 1 | HAI, ABC KOURUSENTA, OO DESU. ("Yes, ABC call center, This is OO.") | 0 |
| 2 | OSEWA NI NATTE ORIMASU. ("I really appreciate your kind assistance.") | 0 |
| ... | ... | ... |
| 16 | SAIKIDOU SHITE ITADAITE IIDESUKA? ("Would you reboot?") | 0.83 |
| 17 | SHITAKEDO, UGOKANAI DESUNE. ("In spite of having done, it does not move.") | 0.78 |
| 18 | HIDARI KARA NIBAN-ME NO BOTAN WO OSHITE MORATTE II DESUKA? ("Would you push the second button form the left?") | 0.92 |
| 19 | NN, OSHITAKEDO YAPPARI DAME MITAI DESU. ("Uh, though I pushed, it does not.") | 0.80 |
| 20 | DEHA, SHUURINI UKAGAWASETE ITADAKIMASU NODE, RENRAKUSAKI OSHIETE ITADAKE MASUKA. ("Then, since we will visit you for repair, may I have your phone number?") | 0.42 |
| 21 | XX-XXXX-XXXX DESU. ("This is XX-XXXX-XXXX.") | 0 |
| ... | ... | ... |

Fig.9

ANALYSIS SENTENCE:
SHITAKEDO, UGOKANAI DESUNE. ("In spite of having done, it does not move.")

MORPHOLOGICAL ANALYSIS:

| | |
|---|---|
| SHI | verb |
| TA | auxiliary verb |
| KEDO | postpositional particle |
| , | symbol |
| UGOKA | auxiliary verb |
| NAI | auxiliary verb |
| DESU | auxiliary verb |
| NE | postpositional particle |
| . | symbol |

Element (word unit):
 "SHI", "TA", "KEDO", ",", "UGOKA", "NAI", "DESU", "NE", "." (9 pieces in total)

Element (word 2-Gram unit):
 "SHITA", "TAKEDO", "KEDO,", ",UGOKA", "UGOKANAI", "NAIDESU", "DESUNE", "NE." (8 pieces in total)

Fig.10

ANALYSIS SENTENCE:
SHITAKEDO, UGOKANAI DESUNE. ("In spite of having done, it does not move.").

Dependency analysis result:

SHITAKEDO, ("In spite of having done") /UGOKANAI DESUNE.("it does not move.")

⟶ : indicating a segment at a start point of an arrow modifies a segment at an end point of the arrow.

Element (dependency unit) :
　"SHITAKEDO→UGOKANAI DESUNE." (one piece in total)

Element (segment unit) :
　"SHITAKEDO,", "UGOKANAI DESUNE." (2 pieces in total)

Element (partial tree unit of syntax tree) :
　"SHITAKEDO,", "UGOKANAI DESUNE.", "SHITAKEDO→UGOKANAI DESUNE."
　(3 pieces in total)

Fig.11

| REPRESENTATIVE WORD | SYNONYM |
|---|---|
| KAMIZUMARI ("paper jam") | KAMI ZUMARI, KAMIZUMARI, YOUSHIZUMARI |
| SAIKIDO ("reboot") | RIBUUTO, reboot |
| ... | ... |

Fig.12

| STOP WORD |
|---|
| , (symbol) |
| . (symbol) |
| NE (postpositional particle) |
| KEDO (postpositional particle) |
| ... |

| Distinctive element of text set |
|---|
| NIBANME("second") |
| SAIKIDO("reboot") |
| KEDO("though") |
| ... |

| Distinctive element of text set | Feature degree |
|---|---|
| NIBANME("second") | 0.87 |
| SAIKIDO("reboot") | 0.78 |
| KEDO("though") | 0.75 |
| ××× | ... |

Fig.17

| SPEECH INDEX | SPEAKER | SPEECH TEXT | TOPIC |
|---|---|---|---|
| 1 | Operator | HAI, ABC KOURUSENTA, OO DESU. ("Yes, ABC call center, This is OO.") | Opening |
| 2 | Operator | OSEWA NI NATTE ORIMASU. ("I really appreciate your kind assistance.") | |
| 3 | Client | OSEWA NI NATTE ORIMASU. ("I always appreciate for your support.") | |
| 4 | Operator | ONANAE NO KATA UKAGATTE MO YOROSHII DESHOUKA? ("May I have your name?") | Identifying client |
| 5 | Client | △△ DESU. ("This is △△.") | |
| 6 | Operator | DOUITTA GOYOUKEN DESHOUKA? ("May I ask what this is in reference to?") | Inquiry contents |
| 7 | Client | ETTO, PURINTA NANDAKEDONE. ("Well, it's a printer.") | |
| 8 | Operator | EE. ("Ah.") | |
| 9 | Client | KINOU KARA, KAMIZUMARI GA HINPATSU SURUN DAYONE. ("Paper jam has occurred frequently from yesterday.") | |
| ... | ... | ... | |
| 15 | Operator | WAKARI MASHITA. ("I understand.") | |
| 16 | Operator | SAIKIDOU SHITE ITADAITE IIDESUKA? ("Would you reboot?") | Procedure |
| ... | ... | ... | |
| 20 | Operator | DEHA, SHUURINI UKAGAWASETE ITADAKIMASU NODE, RENRAKUSAKI OSHIETE ITADAKE MASUKA. ("Then, since we will visit you for repair, may I have your phone number?") | Procedure Contact method |
| 21 | Client | XX-XXXX-XXXX DESU. ("This is XX-XXXX-XXXX.") | Contact method |
| ... | ... | ... | |

TEXT MINING METHOD, TEXT MINING DEVICE AND TEXT MINING PROGRAM

FIELD OF THE INVENTION

The present invention relates to a text mining method, a text mining device, and a text mining program, which target a specific topic.

BACKGROUND OF THE INVENTION

One of technologies analyzing a large amount of text is a text mining technology. The text mining technology is a technology which analyzes a feature or a tendency of a text set. A system to which the text mining technology is applied (hereinafter referred to as text mining system) calculates a feature degree of each element, like a word or a phrase, in each text within a text set, and identifies a distinctive element in the text set on the basis of the feature degree.

Here, the text set which is targeted for researching a feature or a tendency is described as "text set of interest" in the descriptions below. The text mining system uses, for example, a frequency at which each element appears in text, as a feature degree of each element. In this case, the element which frequently appears in the text set of interest is identifies as the distinctive element in the text set of interest. And the text mining system uses, for example, a statistical criterion as the feature degree. In this case, the text mining system can identify a meaningful element in the text set of interest.

One of the text mining technologies is described in Non-Patent Document 1. Non-Patent Document 1 discloses a technology which identifies an element, like a featured word or a phrase, in the text of the attentive category, when an input text set can be divided into two or more than two categories and in case of determining a focused category. In other words, the text mining system which is applied to the technology described in Non-Patent Document 1 identifies a distinctive element of the text set of interest to the set of the text belonging to the focused category as the text set of interest.

A specific method for determining a distinctive element is described. Initially, the text mining system described in Non-Patent Document 1 calculates the number of appearances of each element in the text of the focused category, and the number of appearances of each element in the text of a category other than the focused category. Then, the text mining system calculates a given statistical amount for each element. The given statistical amount is a statistical amount, for example, like SC (Stochastic Complexity) or ESC (Extended Stochastic Complexity), which becomes higher as the number of appearances in the text of the focused category increase, and becomes higher as the number of appearances in the text of the category other than the focused category decreases. Then, the text mining system understands the statistical amount as the feature degree of each element in the focused category, and identifies the element with the large statistical amount as the distinctive element of the focused category.

When analyzing the text set including plural topics using the text mining system, an analyst may target a specific topic (hereinafter referred to as "analysis target topic") and perform text mining. FIG. 17 is an explanatory diagram illustrating telephone call text made from a dialog between a client and an operator in a call center. The telephone call text shown in FIG. 17 includes plural topics, like "opening, client identification, inquiry contents, procedure, and contact method". For example, in order to analyze the inquiry contents in these telephone call text set, the analyst may perform text mining targeting the topic as "inquiry contents".

In this case, initially, the analyst has to identify a part corresponding to the analysis target topic from each text in the input text set. A general topic analyzing system for identifying a part corresponding to the analysis target topic is described in Non-Patent Document 2. The topic analyzing system described in Non-Patent Document 2 divides text including plural topics into bodies having the same topic and allocates a topic to the body using a model which is modeled from an appearance degree of a word corresponding to the topic. The analyst classifies each text into a part corresponding to the analysis target topic and a part not corresponding thereto using this system. The analyst applies a general text mining technology to the part corresponding to the classified analysis target topic. As a result, it becomes possible to analyze the telephone call text shown in FIG. 17.

The text analyzing method is concretely described using FIG. 17. When performing text mining targeting the topic "inquiry contents", the analyst initially applies the topic analyzing system described in Non-Patent Document 2 to each inputted telephone call text and identifies a part corresponding to the topic "inquiry contents". As shown in FIG. 17, the inputted telephone call text is divided for each utterance, and an identifier identifying a topic and each utterance (speech index) is given to each utterance. After identifying the topic using the topic analyzing system, the analyst classifies the divided utterance into a part which is indicated by the utterance indices "6" to "15", a topic of which is "inquiry contents", and the other part. By performing the text mining on the classified telephone call text, the analyst can analyze the inquiry contents.

The text mining method to which is applied after the topic is identified is further described. After the topic is identified, the analyst can classify into a part corresponding to the analysis target topic and a part not corresponding thereto. How the analyst utilizes these parts for the text mining is different depending on a utilized text mining technology or a request of the analyst. A method for performing the text mining using the text mining system described in Non-Patent Document 1 is explained here. When the analysis target topic is targeted for the text mining, the text mining system described in Non-Patent Document 1 can perform two types of the text mining.

The first type of the text mining is a method in which an analysis target is limited to the part corresponding to the analysis target topic in the text. In other words, the text mining system described in Non-Patent Document 1 eliminates a part which does not correspond to the analysis target topic from the analysis target after identifying the corresponding part of the analysis target topic to each text of the inputted text set. The text mining system performs the text mining on only the corresponding part of the analysis target topic.

Suppose, for example, that a telephone call text set in a call center shown in FIG. 17 is an analysis target, and an analyst has an interest in only inquiry contents. In this case, the text mining system described in Non-Patent Document 1 targets only the part corresponding to the analysis target topic "inquiry contents" for analysis of the text mining. In other words, the text mining system described in Non-Patent Document 1 does not perform the text mining which targets the whole telephone call text shown in FIG. 17, but performs the text mining for only the part which is indicated by the speech indices "6" to "15" that is "inquiry contents". Based on this, for example, when assuming that the text set of interest is "text set served by the operator A", the analyst can analyze a distinctive element related to the inquiry contents in elements in telephone call text of the operator A compared with telephone call text of the other operators.

The second type of the text mining is a method for analyzing a distinctive element in a part corresponding to the analysis target topic, and a method using a topic which does not correspond to the analysis target topic for analysis. In other words, this text mining is an analysis in which a text set composed of the parts corresponding to the analysis target topic is regarded as the text set of interest to each text in inputted text set, after identifying the corresponding part of the analysis target topic. Based on this, for example, when the set of the telephone call text in the call center shown in FIG. 17 is the analysis target, the analyst can analyze a distinctive element compared with the part corresponding to the other topic in the elements of the part corresponding to the analysis target topic "inquiry contents".

Further, in Patent Document 1, the mining device extracting distinctive expressions of a text set is described. In Patent Document 2, the technology calculating a value of a relatedness degree by increasing the relatedness degree of a keyword corresponding to a specific name is described.

[Patent Document 1] Japanese Patent Application Laid-Open No. 2006-031198 A (paragraph 0020)

[Patent Document 2] Japanese Patent Application Laid-Open No. 2003-016106 A (paragraphs 0009, 0033, 0034)

[Non-Patent Document 1] Hang Li and Kenji Yamanishi, "Mining from open answers in questionnaire data", In Proceedings of KDD-01, pp. 443-449, 2001.

[Non-Patent Document 2] Rui Amaral and Isabel Trancoso, "Topic Detection in Read Documents", In Proceedings of 4th European Conference on Research and Advanced Technology for Digital Libraries, pp. 315-318, 2000.

DISCLOSURE OF THE INVENTION

Problems to be Solved by the Invention

When the text mining is performed by targeting an analysis target topic, degrees of involvement in the analysis target topics may differ between the parts corresponding to the analysis target topic in the text that is to be analyzed. In that case, the part having deep contents on the analysis target topic is more important than the part without the deep contents thereon, and includes useful information. In particular, when the text in which an important part in the topic exists is the analysis target, degrees of involvement in each topic differ frequently.

But when performing the text mining by targeting the analysis target topic in text including parts whose degrees of involvement in the topic differ from others, the text mining system described in Non-Patent Document 1 cannot handle separately a part with deep contents on the analysis target topic and a part without the deep contents thereon. Therefore, the text mining system described in Non-Patent Document 1 cannot perform the text mining depending on the degrees of involvement in the analysis target topic. Namely, when a text mining system uses a general text mining technology including the text mining technology described in Non-Patent Document 1, a relatively unimportant element which is analyzed on the basis of a part with less involvement in the analysis target topic is included as a result of the text mining on the analysis target topic. Accordingly, there is a problem that accuracy of the text mining targeting the analysis target topic is deteriorated.

For example, suppose that the analysis target of the text mining system is a telephone call text shown in FIG. 17. The telephone call text shown in FIG. 17 includes plural topics. The plural topics are neither independent each other nor exclusive. Therefore, an overlapping part of the topic exists in the telephone call text. In FIG. 17, a part indicated by the speech index "20" is a speech in the topic "procedure" and is also a speech in the topic "contact method". A part at which such topics are overlapped is not deeply related to a specific topic, but a bridge for change of topics.

Here, a case in which the text mining system performs text mining targeting the topic "procedure" is described. The part which deeply relates to the topic "procedure", like the part indicated by the speech index "16", is more important than the part which belongs to the two topics "procedure" and "contact method" and is a bridge between the two topics, like the part indicated by the speech index "20". Therefore, the part includes useful information.

However, if even a part at which topics are overlapped as a bridge of topics (that is part which does not deeply get involved in the topic "procedure"), like the part indicated by the speech index "20", is determined to be a part which corresponds to the topic "procedure", a general text mining treats the part in the same way as the part which deeply gets involved in the topic "procedure" (for example part indicated by the speech index "16"). Consequently, there is a problem that the system using the general text mining technology cannot perform text mining depending on a degree of involvement in the analysis target topic.

As described above, in the general text mining technology, as a result of text mining targeting the topic "procedure", an relatively unimportant element which comes from a part which gets less involved in the topic "procedure" (for example part indicated by the speech index "20") is included and accuracy is deteriorated.

Then, an object of the present invention is to provide a text mining method, a text mining device, and text mining program, which perform text mining targeting a specific topic accurately.

Means for Solving the Problem

The text mining device of the present invention includes an element identification means for calculating a feature degree that is an index for indicating a degree to which an element for a text appears within the text set of interest as a set of text that is to be analyzed, and correcting the feature degree on the basis of a topic relatedness degree that is a value indicating a degree which relates the analysis target topic as a topic for which each part of text which is divided analysis target text into predetermined units targets for analysis when calculating the feature degree, and an output means for identifying a distinctive element within the text set of interest on the basis of the feature degree and outputting the identified element.

The text mining method of the present invention is comprising: calculating a feature degree that is an index for indicating a degree to which an element of a text appears within the text set of interest as a set of text that is to be analyzed, and correcting the feature degree on the basis of a topic relatedness degree that is a value indicating a degree which relates the analysis target topic as a topic for which each part of text which is divided analysis target text into predetermined units targets for analysis when calculating the feature degree, and identifying a distinctive element within the text set of interest on the basis of the feature degree and outputs the identified element.

A text mining program stored in a program recording medium of the invention causes a computer to execute a process of calculating a feature degree that is an index for indicating a degree to which an element of a text appears within the text set of interest as a set of text that is to be analyzed, and correcting the feature degree on the basis of a topic relatedness degree that is a value indicating a degree which relates the analysis target topic as a topic for which each part of text which is divided analysis target text into predetermined units targets for analysis when calculating the feature degree, and identifying a distinctive element within the text set of interest on the basis of the feature degree and outputting the identified element.

Effect of the Invention

On the basis of the present invention, text mining targeting a specific topic can be performed accurately.

BRIEF DESCRIPTION OF THE DRAWINGS

FIG. 6 An explanatory diagram illustrating an example of an input text set including only text.

FIG. 7 An explanatory diagram illustrating an example of an input text set including whole topic information in each part of text.

FIG. 8 An explanatory diagram illustrating an example of an input text set including a topic involvement degree on the topic "procedure".

FIG. 9 An explanatory diagram illustrating an example of speech text analysis

FIG. 10 An explanatory diagram illustrating an example of speech text analysis.

FIG. 11 An explanatory diagram illustrating an example of a synonym dictionary.

FIG. 12 An explanatory diagram illustrating an example of a stop word dictionary.

FIG. 17 An explanatory diagram illustrating a telephone call text.

DETAILED DESCRIPTION OF THE INVENTION

Figure 1:
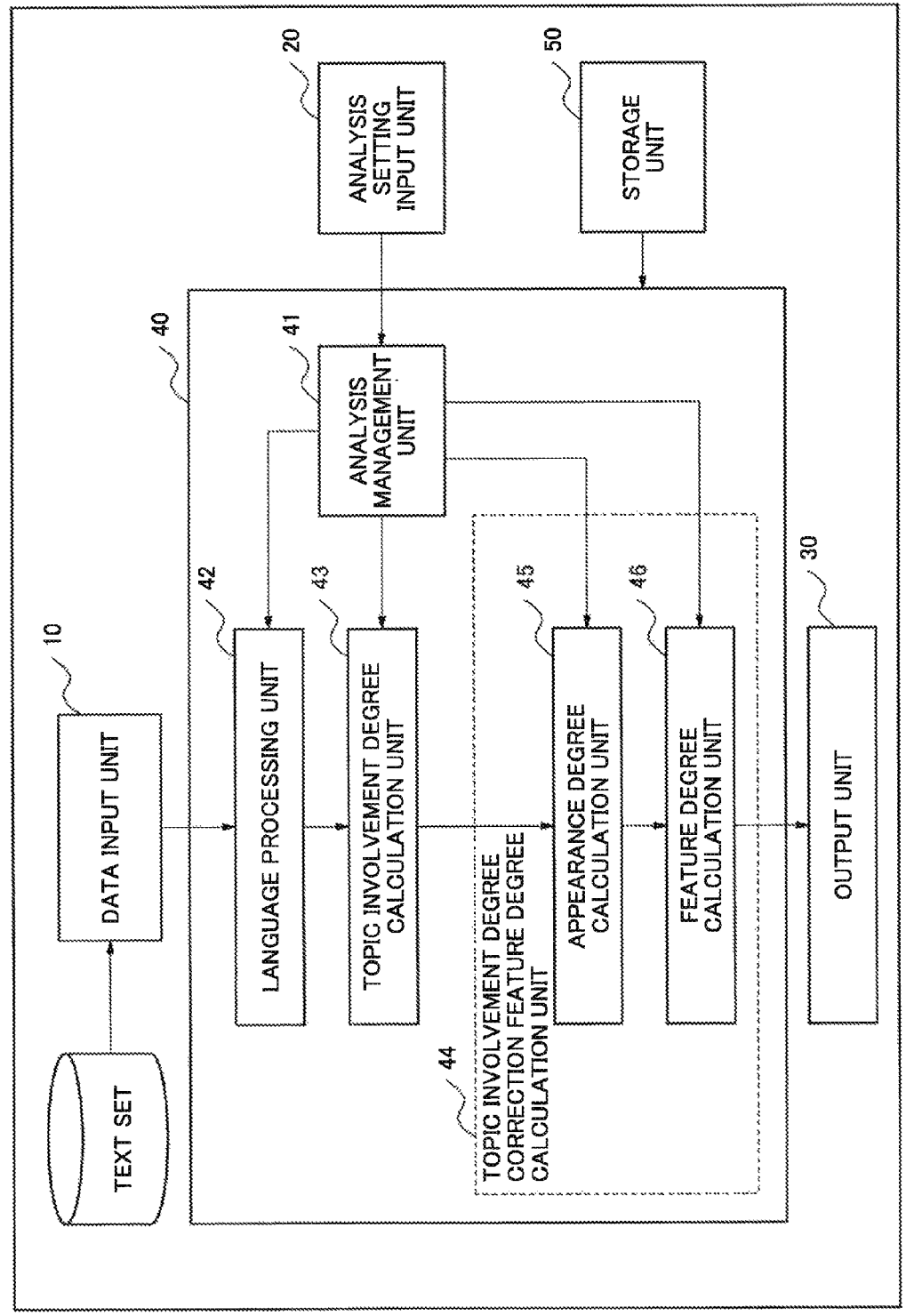
FIG. 1 A block diagram illustrating an exemplary embodiment of a text mining device of the present invention.

An exemplary embodiment of the present invention is described below with reference to the drawings. Further, in the exemplary embodiment of the present invention as following, it is supposed that text targeted by the present invention is described in Japanese. With it, examples shown in the drawings are described in Japanese. However, the technical scope of the present invention is not limited to this. Even though the targets text described by a language other than Japanese, the present invention is applicable to grammars of various languages.

FIG. 1 is a block diagram illustrating an exemplary embodiment of a text mining device of the present invention. The text mining device of the present invention includes a data input unit 10, an analysis setting input unit 20, an output unit 30, and a computer 40 operating based on program control. The computer 40 is formed using a central processing unit, a data processing device including a processor, and the like.

And the computer 40 includes an analysis management unit 41, a language processing unit 42, a topic involvement degree calculation unit 43, and a topic involvement degree correction feature degree calculation unit 44. And, the topic involvement degree correction feature degree calculation unit 44 includes an appearance degree calculation unit 45 and a feature degree calculation unit 46. These units operate as follows.

The data input unit 10 receives a text set (hereinafter referred to as "input text set") which is a target of text mining in the exemplary embodiment of the present invention, as input.

Here, each text in the input text set is a set of parts of units, like a word, a sentence, sentences, a paragraph, an utterance, and the like. The data input unit 10 may receive information in which a topic to which each part of text (occasionally described as partial text) divided into these units belongs, and a value (hereinafter referred to as "topic involvement degree") indicating a degree to which the part get involved in the topic are given to each part. In other words, each part of each text in the input text set (these are a unit, like a word, a sentence, sentences, a paragraph, an utterance, and the like) may be provided with information on a topic which is the topic which these parts belong to and a degree (topic involvement degree) to which they get involved in the topic. Here, that each part gets involved in the topic means that each part relates to the topic. In other words, the topic involvement degree corresponds to a value indicating a degree of relationship with a topic, and therefore may be called a topic relatedness degree. And, the information on the above-mentioned topic may be given to all the parts, or a part thereof. And, the information on the above-mentioned topic may be given only to a specific topic. And, the text received by the data input unit 10 may not be attached the information on the topic. Further, in descriptions below, the case in which the topic involvement degree is given to an utterance unit is described. However, a unit to which the topic involvement degree is given is not limited to the utterance unit.

Next, the analysis setting input unit 20 receives various types of setting information which is necessary for text mining performed for the input text set. The analysis setting input unit 20 is configured using an input device, like a keyboard for example.

The analysis setting input unit 20 receives information that is what a topic that is to be analyzed (analysis target topic) is, and information that is which a partial set of the input text set (hereinafter referred to as text set of interest) for target of a feature and a tendency in the input text set is. And, the analysis setting input unit 20 informs the analysis management unit 41 of the information.

And, the analysis setting input unit 20 may optionally receive settings which indicate narrowing the target of the text mining in the input text set. In this case, the analysis setting input unit 20 informs the analysis management unit 41 described below of the settings. In following processing, the computer 40 does not process the entire input text set, but processes the set target.

The analysis management unit 41 appropriately informs each unit (for details, topic involvement degree calculation unit 43 and topic involvement degree correction feature degree calculation unit 44) of various types of information informed from the analysis setting input unit 20. Concretely, the analysis management unit 41 informs the topic involvement degree calculation unit 43 of information on the analysis target topic. And, the analysis management unit 41 informs the topic involvement degree correction feature degree calculation unit 44 of the information on the analysis target topic and information on the text set of interest. Further, an operation of the each unit which receives the information is described below.

The language processing unit 42 performs language processing with respect to each text of the text set which is the target of text mining. The language processing unit 42 generates an element which becomes an analysis target of text mining. Text which is a target of language processing may be the input text set received by the data input unit 10 and may be the text set of interest transferred from the analysis setting input unit 20 (that is narrowed from the input text set).

Language processing performed by the language processing unit 42 is a process for generating an element utilized in the exemplary embodiment. Concretely, the language processing performed by the language processing unit 42 includes a morphological analysis, a syntactic analysis, a dependency analysis, a synonym processing, a stop word processing, and the like. The element generated by the language processing unit 42 is each element into which input text is divided into a unit of, for example, a word, a word n-Gram, a segment, or dependency thereof, or n consecutive dependency thereof, or a each element divided with unit of partial tree of a syntax tree, or each element of combination of plural above elements (n is a natural number). Contents of language processing performed by the language processing unit 42 and a unit of the generated element performed thereby may be determined in advance, or may be contents of language processing and a unit of the element which the analysis setting input unit 20 receives from a user. In descriptions below, the element generated by the language processing unit 42 is described only as an element.

The topic involvement degree calculation unit 43 receives the analysis target topic which the analysis setting input unit 20 receives from a user, through the analysis management unit 41. And, the topic involvement degree calculation unit 43 calculates, for each part (that is unit of word, sentence, sentences, paragraph, utterance, and the like) of each text in a text set which is a target of text mining (that is input text set or text set of interest), a degree to which the part gets involved in the analysis target topic (that is topic involvement degree). After that, the topic involvement degree calculation unit 43 provides each part with the calculated topic involvement degree. Further, in descriptions below, the case in which the topic involvement degree calculation unit 43 calculates the topic involvement degree for an utterance unit is described. However, a unit for which the topic involvement degree is calculated is not limited to the utterance unit.

The topic involvement degree may be higher as a degree of involvement in the analysis target topic becomes larger. And, the topic involvement degree may be smaller as the degree of involvement in the analysis target topic becomes higher. Further, in descriptions below, the topic involvement degree which becomes larger as the degree of involvement in the analysis target topic becomes higher is described as a positively-correlated topic involvement degree. And, the topic involvement degree which becomes smaller as the degree of involvement in the analysis target topic becomes higher is described as a negatively-correlated topic involvement degree.

For example, when the degree of involvement in the analysis target topic is already provided with each part in each text of the input text set, the topic involvement degree calculation unit 43 may regard the degree as the topic involvement degree. And, the topic involvement degree calculation unit 43 may employ, as described above, the topic involvement degree which becomes larger as the degree of involvement in the analysis target topic becomes higher (that is positively-correlated), as the topic involvement degree. Here, for example, the topic involvement degree calculation unit 43 may apply a model which is preliminarily made and estimates whether or not an input spot is the analysis target topic to each part, and may calculate confidence indicating a degree of confidence for the analysis target topic. After that, the topic involvement degree calculation unit 43 may regard the confidence of the each calculated part, as the topic involvement degree. Further, the topic involvement degree calculation unit 43 may calculate the confidence by applying the model to each unit (for example utterance unit) to which the analysis target topic is given.

For example, suppose that the above model is a model which is used when the probability that the input spot is the analysis target topic is calculated. In this case, the topic involvement degree calculation unit 43 may regard the probability calculated based on the model as the confidence. However, the confidence is not limited to the case of being the probability. And, the range of a value indicating the confidence is not limited to the case of being from 0 to 1. The confidence may be a value which becomes higher as the probability of being the analysis target topic becomes higher.

And, the topic involvement degree calculation unit 43 may calculate so that a value of the topic involvement degree is reduced as the each part corresponds more to topics other than the analysis target topic. And, the topic involvement degree calculation unit 43 may calculate the topic involvement degree utilizing closeness to a topic transition boundary. Here, the topic transition boundary means a place where a topic changes before and after the each part. Further, a concrete method of calculating the topic involvement degree and a method of calculating the topic involvement degree utilizing closeness to the topic transition boundary are described below.

The method of calculating the topic involvement degree performed by the topic involvement degree calculation unit 43 and various setting information used for calculation of the topic involvement degree may be arranged in advance. Or, the analysis setting input unit 20 may receive the calculation method and the setting information from a user.

By the way, a user may hope that when calculating a feature degree on a text set of interest of each element, the text mining device performs analysis using a part corresponding to a topic other than an analysis target topic (for example the second type of the text mining as described above). In this case, the text mining device regards the text set of interest as a text set composed of a part corresponding to the analysis target topic, and analyzes a distinctive element of the text set of interest. Therefore, the topic involvement degree calculation unit 43 may calculate not only a topic involvement degree, but also a degree to which the part gets involved in the topic other than the analysis target topic (hereinafter referred to as "other topic involvement degree") for each part in each text of a text set which is a target of text mining. In this case, the topic involvement degree calculation unit 43 just has to calculate other topic involvement degree in the same way as the topic involvement degree.

The topic involvement degree correction feature degree calculation unit 44 receives information on the analysis target topic and the text set of interest which the analysis setting input unit 20 receives from a user, through the analysis management unit 41. And, the topic involvement degree correction feature degree calculation unit 44 calculates a feature degree of each element on the text set of interest based on a degree to which each element appears in the text set of interest. In this time, the topic involvement degree correction feature degree calculation unit 44 corrects the feature degree based on the topic involvement degree which is provided for each part of the text including the each element.

Further, a user may hope a analysis using a part corresponding to a topic other than the analysis target topic when the feature degree of each element on the text set of interest is calculated (for example analysis like the second type of the text mining above described). In this case, the topic involvement degree correction feature degree calculation unit 44 corrects the feature degree using the other topic involvement degree (degree of involvement in a topic other than the analysis target topic) in addition to the topic involvement degree which is given to each part of text including each element.

Here, the feature degree is a value defined for each element and an index indicating a degree to which the element appears in the text set of interest. In other words, the feature degree is an index representing how much each element distinctively appears in the text set of interest. The feature degree indicates, for example, how many the element appears in the text set of interest (appearance degree) as an index of a degree of appearance. Further, the feature degree indicates how many the element appears while being deviated toward the text set of interest as an index of a degree of appearance (for example how many the element appears in the text set of interest, and how few the element appears outside the text set of interest). For example of the feature degree, "SC", "ESC", or "Chi-square value" are given to the text set of interest, but the feature degree is not limited to these contents.

Operations performed by the appearance degree calculation unit 45 and the feature degree calculation unit 46 included in the topic involvement degree correction feature degree calculation unit 44 are concretely described below.

The appearance degree calculation unit 45 calculates a value indicating a degree to which each element generated by the language processing unit 42 appears in a part (partial text) corresponding to the analysis target topic (hereinafter referred to as appearance degree). The appearance degree calculation unit 45 corrects the calculated appearance degree depending on the involvement degree. The appearance degree is, for example, an index which becomes larger as the element more appears. Namely, the appearance degree calculation unit 45 calculates a value that a degree (that is appearance degree) to which each element appears in the part corresponding to the analysis target topic is corrected depending on the topic involvement degree on the analysis target topic of each part of input text. The appearance degree corrected by the appearance degree calculation unit 45 is described below as an appearance degree after correction.

Further, when the topic involvement degree correction feature degree calculation unit 44 calculates the feature degree of each element on the text set of interest, a user may hope analysis using a part corresponding to a topic outside the analysis target topic (for example analysis like the second type of text mining above described). In this case, the appearance degree calculation unit 45 corrects and calculates an appearance degree in the part corresponding to the topic outside the analysis target topic of each element depending on other topic involvement degree (degree of involvement in the topic outside the analysis target topic). Thereby, the appearance degree after correction of the part corresponding to the topic outside the analysis target topic of each element may be used.

The method of correcting performed by the appearance degree calculation unit 45 and various setting information used for correction may be arranged in advance. Or, the analysis setting input unit 20 may receive the calculation method and the setting information from a user.

Or, the appearance degree calculation unit 45 may use "the number of appearance" as the appearance degree. Here, "the number of appearance" is the number indicating the number of times of appearance in each part in the appearance degree. For example, when an element appears once, the number of appearances becomes "1". When an element does not appear, the number of appearance becomes "0". In this case, the appearance degree calculation unit 45 corrects the number of appearances of appearance of each element in the part corresponding to the analysis target topic so as to increase as each element appears in a part where the topic involvement degree of the analysis target topic is high. Further, as described above, "appearance degree" and "the number of appearance" are defined for each appearance part (each part). And, the appearance degree calculation unit 45 may perform correction of the number of appearances of appearance of each element in the part corresponding to the topic other than the analysis target topic in the same way as correction of the analysis target topic.

Figure 2:
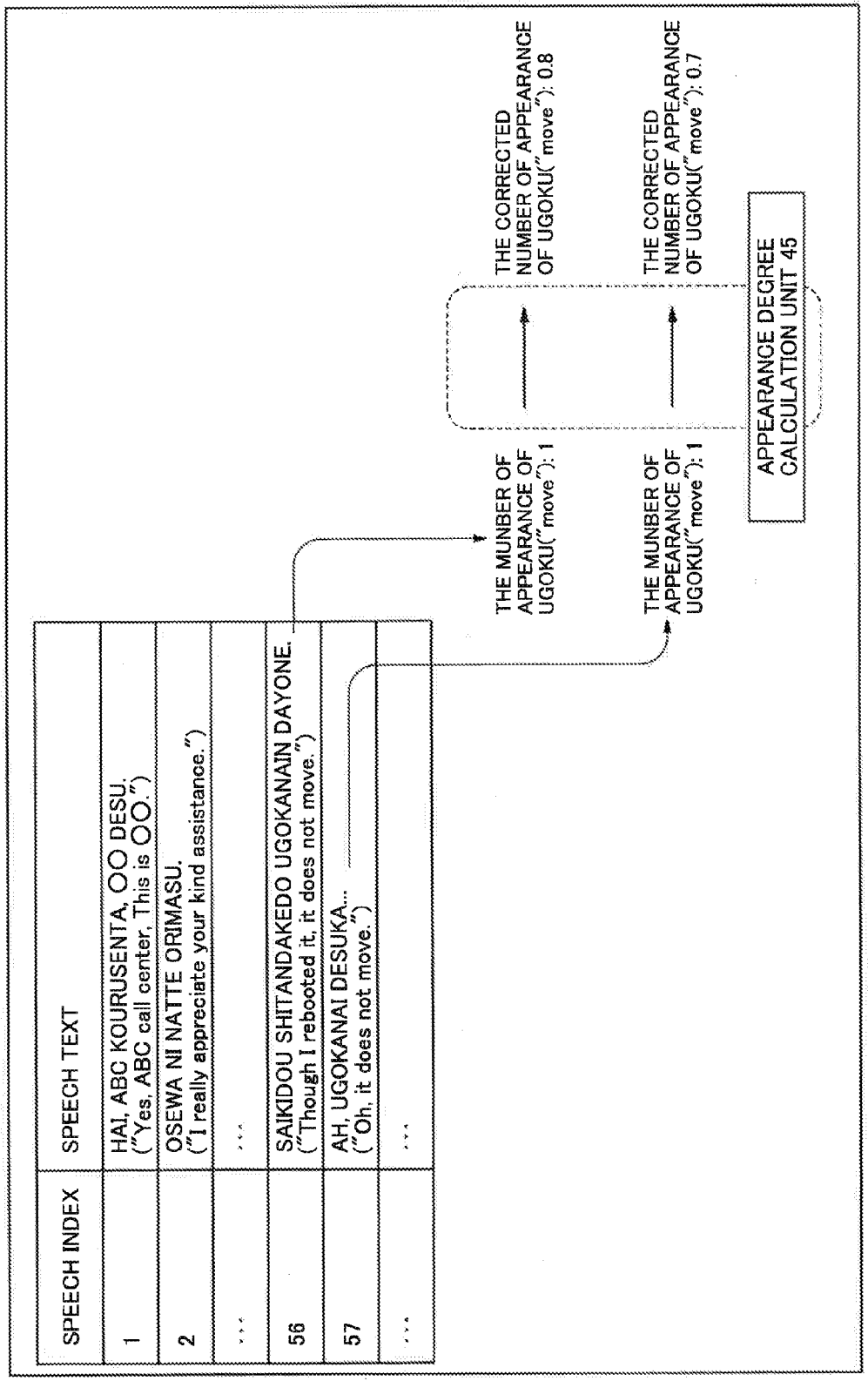
FIG. 2 An explanatory diagram illustrating an example in which the number of appearances is corrected depending on a topic involvement degree.

FIG. 2 is an explanatory diagram illustrating an example in which the appearance degree calculation unit 45 corrects the number of appearances depending on the topic involvement degree. The example shown in FIG. 2 represents that the appearance degree calculation unit 45 calculates the number of appearances of a verb "UGOKA ("move")" and corrects the calculated number of appearances. A word "UGOKA (imperfective form of "move")" is included in "SAIKIDO SHITANDA KEDO UGOKA NAIN DAYONE. (Meaning: "Though I rebooted it, it does not move.")" which is a part indicated by the speech index "56" exemplified in FIG. 2. "UGOKA (imperfective form of "move")" is included in "AH, UGOKA NAI DESUGA . . . (Meaning: "Oh, it dose not move.")" which is a part indicated by the speech index "57" also. Therefore, the number of appearances of "UGIKU ("move")" in the part indicated by the speech index "56" and in the part indicated by the speech index "57" is "1" respectively.

And, the appearance degree calculation unit 45 corrects the derived number of appearances depending on the topic involvement degree. For example, suppose that the topic involvement degree of the part indicated by the speech index "56" is 0.8, and the topic involvement degree of the part indicated by the speech index "57" is 0.7. At this time, the appearance degree calculation unit 45 corrects the number of appearances of an element "UGOKU ("move")" in the part indicated by the speech index "56" into 0.8 depending on the topic involvement degree. Similarly, the appearance degree calculation unit 45 corrects the number of appearances of an element "UGOKU ("move")" in the part indicated by the speech index "57" into 0.7.

Further, a method by which the appearance degree calculation unit 45 corrects the number of appearances is described below.

In the above descriptions, the case where the appearance degree calculation unit 45 utilizes the number of appearances as the appearance degree is described, but the appearance degree is not limited to the number of appearances. For example, the appearance degree calculation unit 45 may use "appearance reliability" as the appearance degree. Here, the appearance reliability is an index indicating reliability of recognizing each word which is provided when speech recognition or character recognition is performed.

Figure 3:
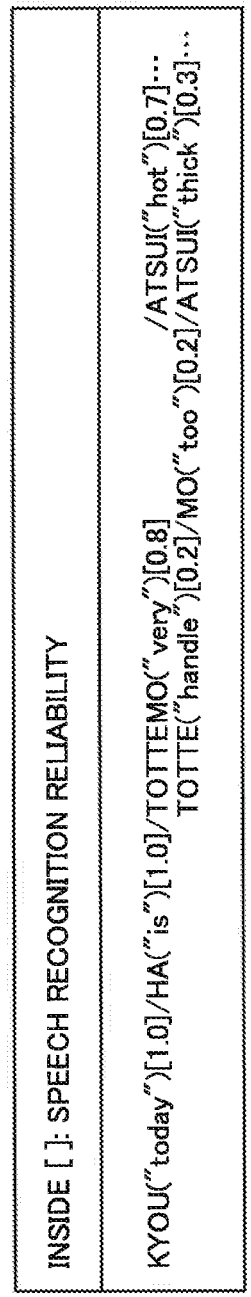
FIG. 3 An explanatory diagram illustrating an example of a result of performance of speech recognition.

FIG. 3 is an explanatory diagram illustrating an example of a result of performing speech recognition. The example shown in FIG. 3 shows words which become a candidate when a speech "KYOU HA TOTTEMO ATSUI. (Meaning: "It is very hot today.")" is recognized, and reliability of the words (speech recognition reliability). For example, it is shown that a part "KYO" is recognized as a word "KYO ("today")" and reliability thereof is "1.0". And, it is shown that when a part "TOTTEMO" is recognized as "TOTTEMO ("very")", reliability thereof is "0.8", and when a part "TOTTEMO" is recognized as "TOTTE ("handle")" and "MO ("too" (one of binding particle))", reliability therein is "0.2" respectively.

The reliability can be understood as a degree to which a word really appears at the spot. Therefore, the appearance degree calculation unit 45 may regard the appearance reliability as the appearance degree, and correct the appearance reliability depending on the topic involvement degree.

Next, the feature degree calculation unit 46 calculates a feature degree of each element on the text set of interest using the appearance degree after correction. In descriptions below, the feature degree calculated using the appearance degree after correction is described as "feature degree after correction". The feature degree calculation unit 46 may calculate the feature degree using the same method as a method for general text mining. The feature degree calculation unit 46 may use, for example, "SC", "ESC", or "Chi-square value" which can be calculated based on the appearance degree (the number of appearances) as an index of the feature degree. Further, the appearance degree used at this time is the appearance degree after correction. And, the feature degree calculation unit 46 may use "frequency" as the simplest index of the feature degree. The calculation method of the feature degree described above is well known and, therefore, detailed descriptions are omitted. Further, various setting information, like an index of the feature degree and a calculation method of the feature degree, which are used by the feature degree calculation unit 46, may be arranged in advance. And, the analysis setting input unit 20 may receive the index and the setting information from a user.

Figure 4:
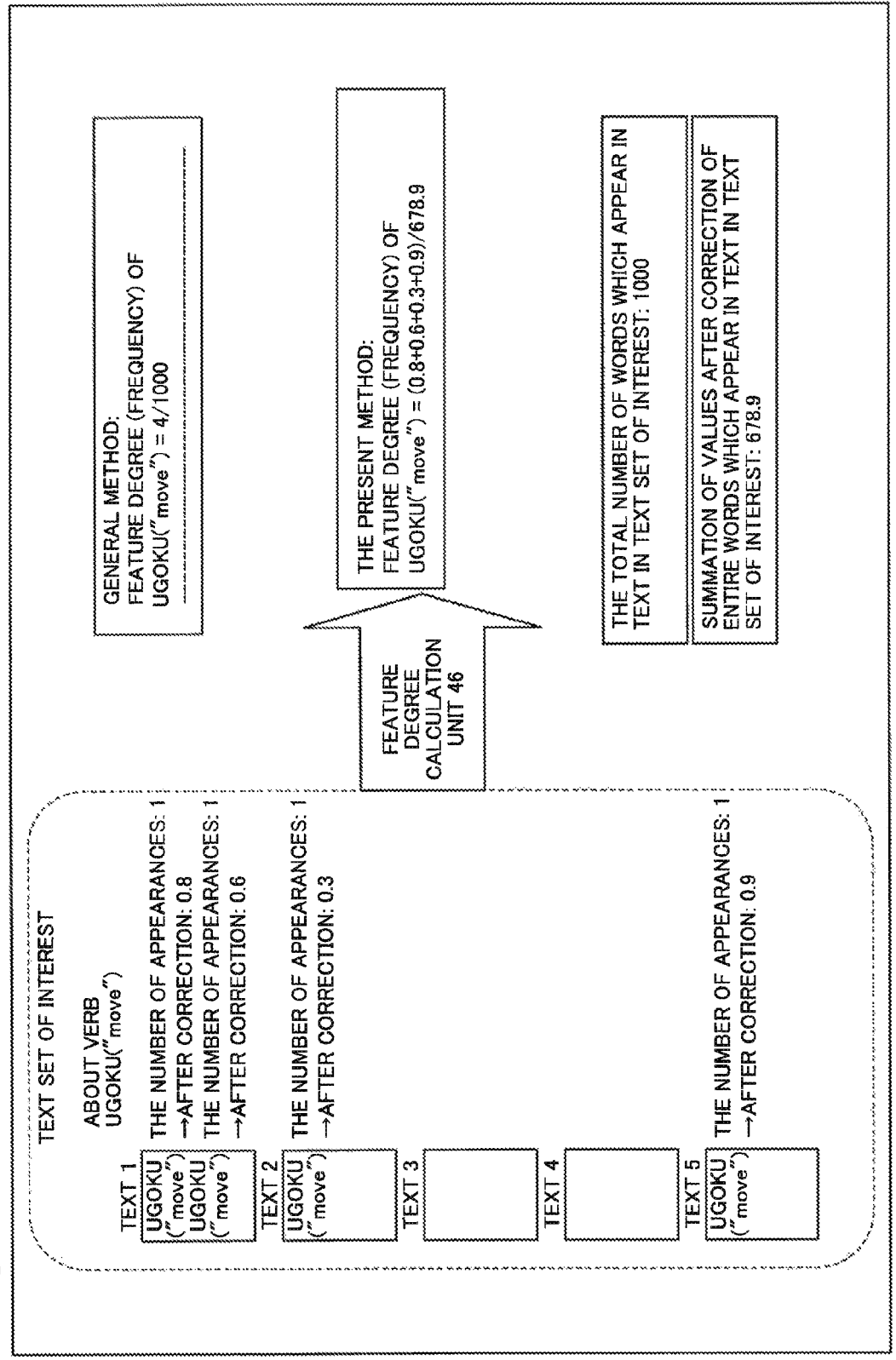
FIG. 4 An explanatory diagram illustrating an example of calculation of an element feature degree of a text set of interest.

FIG. 4 is an explanatory diagram illustrating an example in which the feature degree calculation unit 46 calculates a feature degree of an element on the text set of interest using the number of appearances after correction. In the example shown in FIG. 4, the number of appearances corrected by the appearance degree calculation unit 45 is already provided. FIG. 4 illustrates that the feature degree calculation unit 46 calculates the feature degree of a verb "UGOKU ("move")" on the text set of interest including text 1 to 5 (part enclosed by a dotted line) using the number of appearances after correction. Here, the feature degree calculation unit 46 calculates frequency of the verb "UGOKU ("move")" using the number of appearances after correction and regards the calculated frequency as the feature degree.

The example in FIG. 4 shows that a part where one verb "UGOKU ("move")" appears exists at two spots in text 1 and the number of appearances of each of the parts is corrected into 0.8 and 0.6, respectively. And, a part where one verb "UGOKU ("move")" appears exists at one spot in text 2 and the number of appearances is corrected into 0.3. Similarly, a part where one verb "UGOKU ("move")" appears exists at one spot in text 5 and the number of appearances is corrected into 0.9. Further, a part where the verb "UGOKU ("move")" appears does not exist in text 3 and text 4.

Here, suppose that the total number of words which appears in text in the text set of interest is one thousand. Since four verbs "UGOKU ("move")" appear in the text set of interest if the general calculation method for the feature degree (frequency) is used, the feature degree of the verb "UGOKU ("move")" is calculated to be 4/1000. On the other hand, in the exemplary embodiment, the feature degree calculation unit 46 calculates the feature degree based on the number of appearances after correction. Suppose here that the total number of values after correction of all the words which appears in text in the text set of interest is 678.9. And, the total number of appearances after correction of the verb "UGOKU ("move")" is 0.8+0.6+0.3+0.9. Based on the calculation method of the exemplary embodiment, the feature degree calculation unit 46 can calculate the feature degree of the verb "UGOKU ("move")" to be (0.8+0.6+0.3+0.9)/678.9.

In this way, in the exemplary embodiment, the feature degree calculation unit 46 calculates the feature degree based on the number of appearances which is corrected depending on the topic involvement degree. Therefore, according to the exemplary embodiment, an analyst can perform text mining depending on the degree of involvement in the analysis target topic. An analyst, therefore, can perform text mining targeting the analysis target topic accurately.

The output unit 30 identifies a distinctive element in the text set of interest based on the feature degree after correction, and outputs the identified element. Concretely, the output unit 30 identifies an element having a higher feature degree in the feature degree after correction as the distinctive element in the text set of interest, and outputs the identified element. The output unit 30 may identify, for example, an element having the feature degree which is equal to or more than a predetermined threshold value as the distinctive element and output the element. Otherwise, the output unit 30 may rearrange elements in high order of the feature degree and identify higher n elements (n is a predetermined value based on a user, or the like) as the distinctive elements. And, when outputting a distinctive element, the output unit 30 may output only element which is determined to be distinctive or output a set of the element and the feature degree thereof. And, the output unit 30 may output not only the element which is determined to be distinctive but also a set of elements and the feature degrees thereof on all the elements. And, the output unit 30 may output the feature degree in an output order which is rearranged depending on the feature degree or output without regard to the feature degree (that is without rearrangement).

Further, as described above, the analysis setting input unit 20 may optionally receive setting of language processing performed by the language processing unit 42 and various setting on a calculation method performed by the topic involvement degree calculation unit 43. And, the analysis setting input unit 20 may optionally receive various setting which is used at the time of correction performed by the appearance degree calculation unit 45 and various setting at the time of calculation of the feature degree by the feature degree calculation unit 46. In this time, the analysis setting input unit 20 may inform the analysis management unit 41 of inputted information. The analysis management unit 41 informs each unit (for details, the language processing unit 42, the topic involvement degree calculation unit 43, the appearance degree calculation unit 45, and the feature degree calculation unit 46) of informed information appropriately. The each unit may use the information when processing.

The analysis management unit 41, the language processing unit 42, the topic involvement degree calculation unit 43, and the topic involvement degree correction feature degree calculation unit 44 (for details, the appearance degree calculation unit 45 and the feature degree calculation unit 46) are configured using a central processing unit, and the like in the computer 40 operated by a program (text mining program). The program is stored, for example, in a storage unit 50 that is memory, a HDD, and the like. The central processing unit may read the program and operate as the analysis management unit 41, the language processing unit 42, the topic involvement degree calculation unit 43, and the topic involvement degree correction feature degree calculation unit 44 (for details, the appearance degree calculation unit 45 and the feature degree calculation unit 46) according to the program. And, each of the analysis management unit 41, the language processing unit 42, the topic involvement degree calculation unit 43, and the topic involvement degree correction feature degree calculation unit 44 (for details, the appearance degree calculation unit 45 and the feature degree calculation unit 46) may be configured using exclusive hardware.

Figure 5:
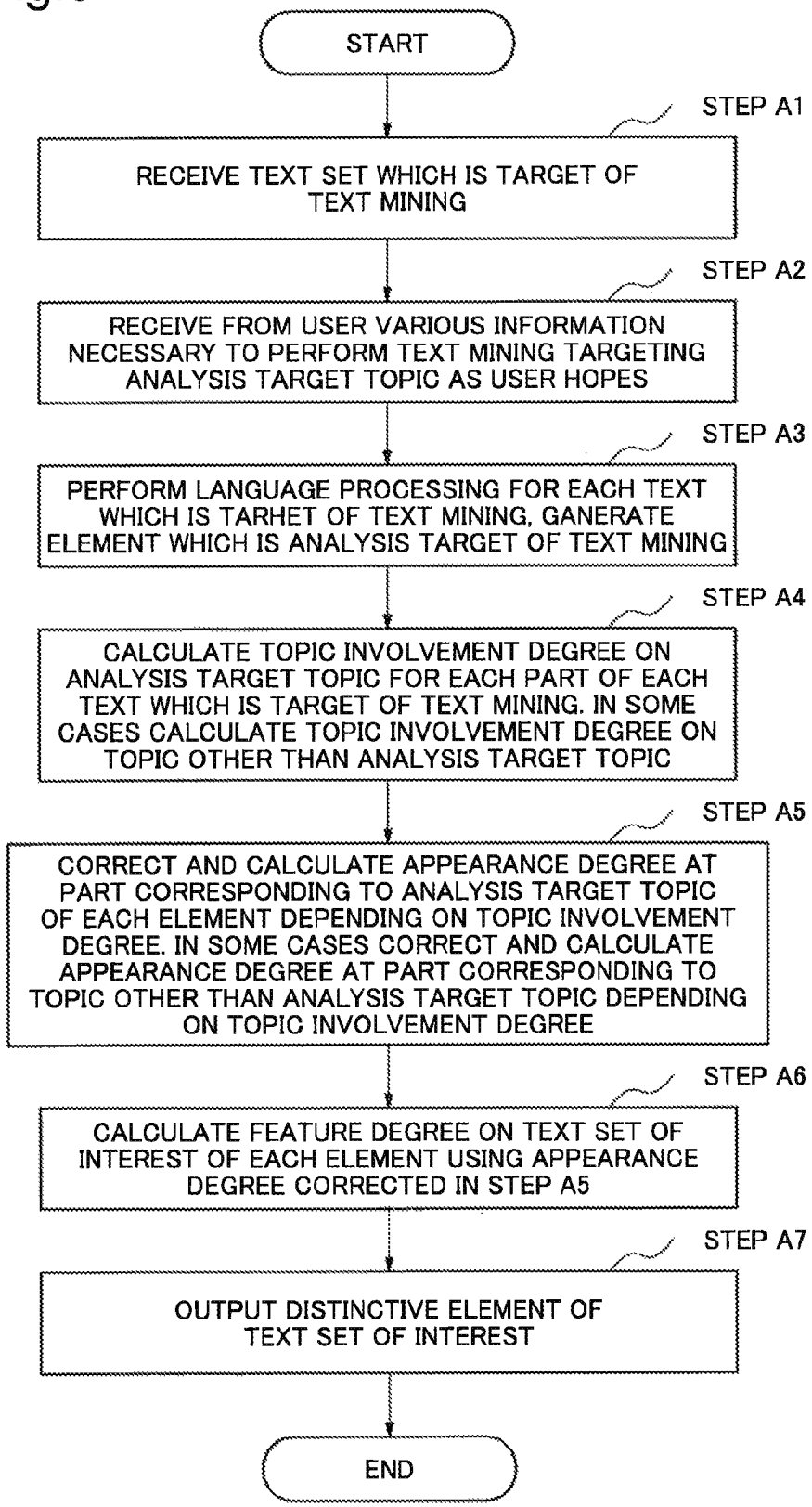
FIG. 5 A flowchart illustrating a text mining method of the exemplary embodiment.

Next, operations are described. FIG. 5 is a flowchart illustrating a text mining method of the exemplary embodiment.

Initially, the data input unit 10 receives a text set which is the target of the text mining (that is input text set) in the exemplary embodiment of the invention as an input (step A1). Then, the analysis setting input unit 20 receives various setting information which is required for the text mining on the input text set according to user's instructions (step A2). Further, the analysis setting input unit 20 may optionally receive setting of language processing performed by the language processing unit 42 and various setting on a calculation method performed by the topic involvement degree calculation unit 43. And, the analysis setting input unit 20 may optionally receive various setting which is used at the time of correction performed by the appearance degree calculation unit 45 and various setting at the time of calculation of the feature degree by the feature degree calculation unit 46. The inputted information is appropriately transferred from the analysis management unit 41 to each unit when operations at and after step A3 described below are performed. And, in step A2, the analysis setting input unit 20 may receive an instruction to repeat processing for each instructed analysis target.

Then, the language processing unit 42 performs language processing for each text of the text set which is a target of the text mining and generates an element which is an analysis target of text mining (step A3). Each processing is performed for an element generated by the language processing unit 42 at and after step A4. Further, in each processing at and after step A4, each unit may perform processing which is limited to only element existing in the text set of interest.

Next, the topic involvement degree calculation unit 43 receives an analysis target topic instructed by a user at step A2 (that is analysis target topic which the analysis setting input unit 20 receives from a user) through the analysis management unit 41. Then, the topic involvement degree calculation unit 43 calculates a topic involvement degree on the analysis target topic with respect to each part in each text which is a target of text mining. Further, the topic involvement degree calculation unit 43 may calculate a topic involvement degree on a topic other than the analysis target topic (step A4).

Then, the topic involvement degree correction feature degree calculation unit 44 receives the analysis target topic instructed by a user at step A2 and information on the text set of interest (that is the analysis target topic and information on the text set of interest which the analysis setting input unit 20 receives from a user), through the analysis management unit 41. And, the topic involvement degree correction feature degree calculation unit 44 calculates a feature degree of each element on the text set of interest. In this time, the topic involvement degree correction feature degree calculation unit 44 corrects a feature degree of each element depending on the topic involvement degree, which is calculated at step A4, representing a degree of involvement in the analysis target topic of each part in the input text.

Concretely, the appearance degree calculation unit 45 calculates an appearance degree to which each element appears in each part corresponding to the analysis target topic, and corrects the calculated each appearance degree depending on the topic involvement degree. Further, the appearance degree calculation unit 45 may calculate an appearance degree to which appears in each part corresponding to a topic other than the analysis target topic, and correct the calculated appearance degree depending on other topic involvement degree (step A5). Namely, the appearance degree calculation unit 45 calculates corrected value of a degree of appearance in a part corresponding to the analysis target topic of each element generated in step A3 (that is appearance degree) depending on the topic involvement degree on the analysis target topic of each part in input text calculated in step A4.

Next, the feature degree calculation unit 46 calculates a feature degree of each element on the text set of interest using the appearance degree after correction. Finally, the output unit 30 outputs a distinctive element on the text set of interest based on the feature degree after correction calculated in step A6 (step A7).

Further, the analysis setting input unit 20 may receive an instruction to repeat processing for each designated analysis target in step A2. In this case, the analysis management unit 41 receives processing steps of text mining from the analysis setting input unit 20. After that, the analysis management unit 41 manages the language processing unit 42, the topic involvement degree calculation unit 43, and the topic involvement degree correction feature degree calculation unit 44 (for details, the appearance degree calculation unit 45 and the feature degree calculation unit 46), and each unit performs each processing according to the instructed processing steps.

In this way, by performing the processing based on the instruction to repeat the processing, not only an one-time text mining trial in which an analysis axis, like the text set of interest and the analysis target topic is one, but also more than once text mining trials with changing the analysis axis becomes possible.

And, the instruction to repeat processing is not necessarily an instruction to wholly perform each step exemplified in steps A1 to A7, but may be an instruction to change the processing depending on analysis processing. For example, regarding processing which can use a result once analyzed, an instruction to prohibit repetition of the processing may be included. For example, when text mining target text is the same and only the analysis target topic is changed, a language processing result of the text mining target text may be used when the topic is changed. In the second and subsequent analyses, therefore, the text mining device may streamline analysis processing by operating according to the instruction prohibiting processing exemplified in the step A2.

As described above, according to the exemplary embodiment, the topic involvement degree correction feature degree calculation unit 44 calculates an index (feature degree) indicating a degree to which an element of text appears in a text set of interest which is a set of analysis target text. The topic involvement degree correction feature degree calculation unit 44 identifies a distinctive element in the text set of interest based on the calculated feature degree. Concretely, the appearance degree calculation unit 45 corrects, with the analysis target text, the feature degree based on a value indicating a degree (topic involvement degree) to which each text part divided into a predetermined unit, for example an utterance unit, gets involved in (relate to) the analysis target topic. Since a distinctive element is identified using the method above, an analyst can perform text mining targeting a specific topic accurately.

And, according to the exemplary embodiment, the topic involvement degree correction feature degree calculation unit 44 calculates a degree (appearance degree) to which an element appears in partial text corresponding to the analysis target topic. Then, when calculating the feature degree, the appearance degree calculation unit 45 corrects the appearance degree more highly as an element appears in a part where the topic involvement degree (it may be described as topic relatedness degree) is at a high level. Then, the feature degree calculation unit 46 calculates the feature degree using the corrected appearance degree and identifies (for example an element having the feature degree equal to or more then a threshold value, or higher n elements) as a distinctive element in the text of interest based on the feature degree calculated using the corrected appearance degree.

In this way, since the feature degree of each element in the input text is corrected depending on a degree to which an appearance part of an element gets involved in the analysis target topic, an analyst can perform text mining depending on a degree of involvement in the analysis target topic. And, an analyst can perform text mining targeting the analysis target topic accurately.

Namely, in the exemplary embodiment, in step A5, the appearance degree calculation unit 45 corrects the appearance degree to which each element appears in a part corresponding to the analysis target topic in the input text depending on a degree to which an appearance part of the element gets involved in the analysis target topic. And, in step A6, the feature degree calculation unit 46 calculates the feature degree using the corrected value. Therefore, the feature degree of each element in the input text is corrected depending on a degree to which an appearance part of each element gets involved in the analysis target topic. In other words, an analyst can perform text mining depending on a degree of involvement in the analysis target topic and can perform text mining targeting the analysis target topic accurately.

For example, suppose that a method, in which the appearance degree of appearance of each element is highly corrected, as the topic involvement degree of the appearance part of the element becomes higher, is employed, as a correction method in step A5. In this case, an influence of an element which appears in a part (part where the topic involvement degree is high) which gets deeply involved in the analysis target topic and which is important for analysis of the analysis target topic becomes large. On the contrary, in this case, an influence of an element which appears in a part (part where the topic involvement degree is low) which gets less involved in the analysis target topic and which appears in a relatively unimportant becomes small. Therefore, for example, it is possible to get the effect that an element which appears in a bridge part of a topic which is relatively unimportant for analysis of the specific topic becomes difficult to be a distinctive element. In this way, an analyst can perform text mining targeting the analysis target topic accurately.

EXEMPLARY

The present invention is described below using a concrete exemplary and drawings but the scope of the present invention is not limited to contents described below. Further, in descriptions below, processing is performed according to a flowchart exemplified in FIG. 5.

Here, processing that an analyst carries out text mining which is limited to a part of the procedure and targets a telephone call at a call center between a client and an operator is described. And, in this text mining, distinctive things of an operator A compared with the other operator are analyzed.

In text mining of this case, suppose that the data input unit 10 receives a set of telephone call text made from a dialogue at a call center between a client and an operator exemplified in FIG. 6, FIG. 7, and FIG. 8 as an input text set. And the analysis setting input unit 20 receives a topic "procedure" as an analysis target topic and "text set served by the operator A" as a text set of interest separately. An analysis using the above text mining (text mining limited to the procedure) is described below as an analysis (1). The analysis (1) is an example of an analysis in which only part corresponding to an analysis target topic is used, when a feature degree on a text set of interest of each element in text is calculated.

Further, in exemplary below, an example of text mining, which is performed when an analyst targets a telephone call at a call center between a client and an operator and analyzes an distinctive element of the topic "procedure" compared with the other topic, is appropriately described.

In text mining of this case, suppose that the data input unit 10 also receives a set of telephone call text made from a dialogue at a call center between a client and an operator exemplified in FIG. 6, FIG. 7, and FIG. 8 as an input text set. And, the analysis setting input unit 20 receives a topic "procedure" as an analysis target topic and "set of a text part corresponding to the topic "procedure" as a text set of interest separately. As following, an analysis using the above text mining (text mining which is performed when a distinctive element of the topic "procedure" compared with the other topic is analyzed) is described below as an analysis (2). The analysis (2) is an example of an analysis in which a part corresponding to the analysis target topic and a part corresponding to a topic other than the analysis target topic is used when a feature degree on the text set of interest of each element in text is calculated.

Initially, the data input unit 10 receives a set of telephone call text made from a dialog at a call center between a client and an operator exemplified in FIG. 6, FIG. 7, and FIG. 8 as an input text set. FIG. 6 is an explanatory diagram illustrating an example of an input text set including only text. FIG. 7 is an explanatory diagram illustrating an example of an input text set in which all the topic information (topic and topic involvement degree) is given to each part of text. FIG. 8 is an explanatory diagram illustrating an example of an input text set having a topic involvement degree on "procedure" in the topics. Further, in FIG. 6, FIG. 7, and FIG. 8, a column of speech index is given for convenience of explanation, but the speech index is not included in an input text set.

Each text of an input text set in the exemplary includes information on plural topics shown in the example of FIG. 7, and is text in which a part corresponding to the plural topics ("procedure" and "contact method") exists as exemplified in the speech index "20" in FIG. 7.

In explanation below, as exemplified in FIG. 7, a case in which topic information including a topic which each part belongs to and a degree of involvement in the topic (that is, topic involvement degree) is given to an utterance unit of each text in an input text set is described. Further, the unit to which the topic information is given (that is the unit which each text is divided to) is not limited to the utterance unit. The topic information may not be the utterance unit, and may be a word unit, a sentence unit, sentences unit, or a paragraph unit.

And, an example shown in FIG. 7, for example, a part indicated by the speech index "16" indicates that it gets involved in the topic "procedure" in a degree 0.83. And, a part indicated by the speech index "20" indicates that it gets involved in the topic "procedure" in a degree 0.42 and the topic "contact method" in a degree 0.35. This shows that the part indicated by the speech index "16" gets deeply involved in the topic "procedure" compared with the part indicated by the speech index "20".

Further, the topic information may not be information on all the topics, but be information on a part of topics as exemplified in FIG. 8. An example of FIG. 8 illustrates that only information on the topic "procedure" is given. And, as exemplified in FIG. 6, input text may be text without the topic information.

Further, the above processing corresponds to processing to step A1 exemplified in FIG. 5.

Then, in order to conduct analysis desired by a user, the analysis setting input unit 20 receives various information which is necessary to perform text mining targeting an analysis target topic on an input text set from a user. Concretely, it is instructed by the user that an analysis target topic is the topic "procedure", and a text set of interest is "text set served by the operator A".

For example, the analysis setting input unit 20 may show a list of all the topics included in each text in the input text set to the user, recognize the analysis target topic that the user instructs from the list, and determine to receive the instruction of the analysis target topic.

Concretely, initially, the analysis setting input unit 20 shows a list "opening, procedure, contact method, . . . " to the user. Then, if the user designates "procedure" as an analysis target topic from the list, the analysis setting input unit 20 recognizes that the user designates the topic "procedure", and sets "procedure" as the analysis target topic.

And, the analysis setting input unit 20, for example, may shows each text of the input text set to the user, recognize the text set which the user instructs as a text to be a text set of interest, and determine to receives designation of the text set.

Concretely, initially, the analysis setting input unit 20 shows each text of the input text set to the user. Then, if the user designates "text set served by the operator A" from the shown text, the analysis setting input unit 20 recognizes the text set designated by the user, and sets "text set served by the operator A" as the text set of interest.

Further, when an analysis is conducted using a method exemplified in the analysis (2), the analysis setting input unit 20 may receive designation of a set of a text part corresponding to a specific topic as the text set of interest. In this case, the analysis setting input unit 20, for example, shows a list of all the topics included in each text in the input text set to the user. Then, the analysis setting input unit 20 may recognize a topic which a user has an interest in as the text set of interest designated from the list, and set the set of a part corresponding to the designated topic as the text set of interest.

And, when additional information (serving operator name, serving date and time, serving time, client name, and the like) is added to each text of the input text set in advance, the analysis setting input unit 20 may show a list of additional information as a point of view of analysis to the user. Then, if the user designates the point of view of analysis which is desired to be a text set of interest, the analysis setting input unit 20 may recognize the designated point of view and set a text corresponding to the point of view as the text set of interest.

For example, when the serving operator name is previously given to each text of the input text set as additional information in advance, the analysis setting input unit 20 may show a list of the serving operator name to the user. Then, if the user designates "operator A", the analysis setting input unit 20 may recognize the designation and set "text set served by the operator A" as the text set of interest. In this way, the analysis setting input unit 20 can set the text corresponding to the point of view designated by the user as the text set of interest.

The analysis setting input unit 20 informs the analysis management unit 41 of information on an analysis target topic and a text set of interest. Then, in following processing (for example, processing of step A4 exemplified in FIG. 5), the information of an analysis target topic is transferred to the topic involvement degree calculation unit 43 using the analysis management unit 41 and is utilized. Similarly, in following processing (for example, processing of step A5 and step A6 exemplified in FIG. 5), the information of an analysis target topic and a text set of interest is transferred to the topic involvement degree correction feature degree calculation unit 44 using the analysis management unit 41 and is utilized.

The analysis setting input unit 20 may optionally receive setting of language processing performed by the language processing unit 42 and various setting on a calculation method performed by the topic involvement degree calculation unit 43. And, the analysis setting input unit 20 may optionally receive various setting which used at the time of correction performed by the appearance degree calculation unit 45 and various setting at the time of feature degree calculation by the feature degree calculation unit 46. In this case, the analysis setting input unit 20 informs the analysis management unit 41 of setting and information received by the analysis setting input unit 20. Then, for example, when operations at or after step A3 exemplified in FIG. 5 are performed, each unit (for details, the language processing unit 42, the topic involvement degree calculation unit 43, the appearance degree calculation unit 45, and the feature degree calculation unit 46) may receive various setting from the analysis management unit 41 and use them. An example of a concrete setting item is described in following processing of each unit which uses the setting.

And, the analysis setting input unit 20 may optionally receive setting at the time of narrowing down the text mining target from the input text set. Further, processing which the analysis setting input unit 20 narrows down the text mining target is achieved by the same processing as that of the method of setting the text set of interest above described.

In other words, the analysis setting input unit 20 shows each text of the input text set to the user. Then, when the user designates text which is hoped to be a text mining target, the analysis setting input unit 20 just has to recognize the designated text as the text mining target. And, when the additional information is given to each text of the input text set in advance, the analysis setting input unit 20 shows a list of the additional information to the user. Then, when a part which the user desires to be the text mining target is designated, the analysis setting input unit 20 just has to recognize the designated part as the text mining target.

As a result narrowing down in this way, the text set which becomes the text mining target is transferred to the analysis management unit 41, and used in each processing at or after step A3 exemplified in FIG. 5 after that. In this case, in each processing at or after step A3 exemplified in FIG. 5, each processing is conducted not by targeting the whole of the input text set, but by targeting the text set which is the result narrowing down.

Further, in descriptions below, processing which is performed when the text mining target is not narrowed down is exemplified, but processing which is performed when the text mining target is narrowed down is similar thereto. In other words, when the text mining target is narrowed down, processing targeting "input text set" in following explanations may be replaced with processing targeting "text set of result narrowing down the input text set in step A2 exemplified in FIG. 5" (that is text set of result narrowing down the input text set by the analysis setting input unit 20).

Further, the above processing corresponds to processing to step A2 exemplified in FIG. 5.

Next, the language processing unit 42 performs language processing on each text of the input text set and generates an element which becomes an analysis target of text mining. A unit of the concrete language processing performed and a unit of the generated element by the language processing unit 42 may be arranged in advance or may be arranged in step A2 exemplified in FIG. 5 (that is transferred from the analysis setting input unit 20).

Further, the unit of concrete language processing and the element is the same as the unit of language processing and the element used in the normal text mining technology. For example, a word, a word n-Gram, a segment, or dependency thereof, or n consecutive dependency thereof, or each element divided in a unit of a partial tree of a syntax tree, or each element of combination of a plurality of these elements are enumerated as the unit of the concrete element. Here, "n" in the word n-Gram and "n" in the n consecutive dependency is a natural number, and, for example, may be a value manually arranged.

And, as concrete language processing, morphological analysis, syntactic analysis, dependency analysis, and the like are performed according to a unit of the generated element. For example, when the word or the word n-Gram is included as a unit of the element, the language processing unit 42 performs the morphological analysis and generates an element.

FIG. 9 is an explanatory diagram illustrating an example in which speech text indicated by the speech index "17" exemplified in FIG. 6 is analyzed. The table exemplified in FIG. 9 is a table which divides into words from a sentence that is speech text "SHI TA KEDO, UGOKA NAI DESU NE. (Meaning: "In spite of having done, it does not move.")" by morphological analysis, and associates each word and a part of speech with each other. Here, if a unit of the element is a word unit, the elements are following nine elements "SHI ("done")", "TA ("having")", "KEDO ("in spite of")", ",", "UGOKA (imperfective form of "move")", "NAI ("not")", "DESU ("it does")", "NE (interjectional particle)", ".". And, if a unit of an element is a word 2-Gram unit, the elements are following eight elements "SHITA ("having done")", "TAKEDO ("in spite of having")", "KEDO, ("in spite of,")", ", UGOKA (","+imperfective form of "move")", "UGOKANAI ("not move")", "NAIDESU ("it does not")", "DESUNE ("it does"+interjectional particle)", "NE. (interjectional particle+".")".

And, for example, if dependency, n consecutive dependency, a segment, or a partial tree of a syntax tree is included, the language processing unit 42 performs the dependency analysis or the syntactic analysis and generates elements.

FIG. 10 is an explanatory diagram illustrating an example in which the speech text indicated by the speech index "17" exemplified in FIG. 6 is analyzed. The example shown in FIG. 10 illustrates a result of the dependency analysis on an analysis sentence "SHI TA KEDO, UGOKA NAI DESU NE. (Meaning: "In spite of having done, it does not move.")". In the dependency analysis result exemplified in FIG. 10, the slash "/" in the drawing indicates a segment delimiter and an arrow in the drawing indicates that a segment at a start point of the arrow modifies a segment at an end point of the arrow.

Here, if a unit of the element is a dependency unit, the element is one element "SHI TA KEDO (Meaning: "In spite of having done")→UGOKA NAI DESU NE. (Meaning: "it does not move.")". And, if a unit of the element is a segment unit, the element is two elements "SHI TA KEDO, (Meaning: "In spite of having done,")", "UGOKA NAI DESU NE (Meaning: "it does not move")". Moreover, if a unit of the element is a partial tree of a syntax tree, the element is three elements "SHI TA KEDO, (Meaning: "In spite of having done,")", "UGOKA NAI DESU NE (Meaning: "it does not move")", "SHI TA KEDO (Meaning: "In spite of having done")→UGOKA NAI DESU NE. (Meaning: "it does not move.")".

Moreover, when synonym processing or stop word processing is designated as setting of language processing, the language processing unit 42 may perform these processing. For example, the language processing unit 42 performs the synonym processing by using information on synonymous relation between elements preliminarily arranged or received by the analysis setting input unit 20. FIG. 11 is an explanatory diagram illustrating an example of a synonym dictionary. The example shown in FIG. 11 shows plural synonymous words (synonym) are associated with a representative word. For example, the second line in the table exemplified in FIG. 11 shows that "SAIKIDO" "RIBUUTO" "reboot" have the same meaning. The language processing unit 42 may perform synonym processing using a dictionary defining the synonymous relation between words exemplified in FIG. 11. In this case, the language processing unit 42 regards elements with the synonymous relation in inputted information as the same element. Hereafter, processing at or after step A4 exemplified in FIG. 5 is performed using the information regarded in this way. For example, when the synonym dictionary exemplified in FIG. 11 is used, the language processing unit 42, when a word set as synonym appears, replaces the word into a corresponding representative word. After that, processing at or after step A4 exemplified in FIG. 5 is performed using the replaced representative word.

And, the language processing unit 42 may perform the stop word processing using information on an element which is unnecessary for an analysis target of text mining preliminarily arranged or received by the analysis setting input unit 20. FIG. 12 is an explanatory diagram illustrating an example of a stop word dictionary. The example in FIG. 12 shows a list of the stop words is registered as the stop word dictionary. As exemplified in FIG. 12, an element registered in the stop word dictionary is not limited to a word. In the stop word dictionary, an unnecessary element may be defined using information other than a word, like a part of speech. In this case, the language processing unit 42 removes a corresponding element from an analysis target element for text mining based on set information.

For example, when the stop word dictionary exemplified in FIG. 12 is used, the language processing unit 42 removes ",", ".", "KEDO ("in spite of")", and "NE (interjectional particle)" from elements of a word unit of speech text indicated by the speech index "17" exemplified in FIG. 9 "SHI ("done")", "TA ("having")", "KEDO ("in spite of")", ",", "UGOKA (imperfective form of "move")", "NAI ("not")", "DESU ("it does")", "NE (interjectional particle)", and ".". In this case, in step A3 exemplified in FIG. 5, five elements "SHI ("done")", "TA ("having")", "UGOKA (imperfective form of "move")", "NAI ("not")", and "DESU ("it does")" are outputted as an element of a word unit of an analysis sentence "SHI TA KEDO, UGOKA NAI DESU NE. (Meaning: "In spite of having done, it does not move.")".

Further, the above processing corresponds to processing to step A3 exemplified in FIG. 5.

Next, the topic involvement degree calculation unit 43 receives that the topic "procedure" is designated as an analysis target topic by the user, through the analysis management unit 41. Then, the topic involvement degree calculation unit 43 calculates a topic involvement degree indicating a degree to which each part of each text in the input text set gets involved in the analysis target topic "procedure", and provides each part with the calculated topic involvement degree.

In step A4 exemplified in FIG. 5, the topic involvement degree calculation unit 43 can use, for example, a word, a sentence, sentences, a paragraph, an utterance unit, and the like, as a unit of each part to which the topic involvement degree is given. The unit of each part may be arranged in advance, or may be a unit received by the analysis setting input unit 20. Here, a case that the topic involvement degree is provided in an utterance unit is described below.

Here, as exemplified in FIG. 7, when each part of each text of the input text set is provided with a topic which the part belongs to and topic information including a degree of involvement in the topic, the topic involvement degree calculation unit 43 may use information which is already given as a degree of involvement in the topic, as the topic involvement degree. And, as exemplified in FIG. 8, when each part of each text is provided with a degree to which the part gets involved in the analysis target topic (here, topic "procedure"), the topic involvement degree calculation unit 43 may use information which is already given as a degree of involvement in the topic, as a topic involvement degree.

For example, when text exemplified in FIG. 7 and FIG. 8 is inputted, topic involvement degrees on the analysis target topic "procedure" of parts indicated by the speech indexes "1", "16" and "20" are 0, 0.83, and 0.42, respectively.

Further, both a unit of an involvement degree which is given to each text of the input text set exemplified in FIG. 7 and FIG. 8 and a unit to which the topic involvement degree calculation unit 43 gives a topic involvement degree in step A4 exemplified in FIG. 5 are utterance units. Therefore, an involvement degree which is given at the time of input can be used as a topic involvement degree without any change. However, the unit of an involvement degree which is given to each text of the input text set may differ from the unit to which the topic involvement degree calculation unit 43 gives a topic unit. Processing, in case that the unit of an involvement degree which is given to input text differs from the unit to which the topic involvement degree calculation unit 43 gives a topic involvement degree in step A4 exemplified in FIG. 5, is described below.

Initially, a case in which the unit to which the topic involvement degree calculation unit 43 gives a topic involvement degree is shorter than the unit of an involvement degree which is given to input text in step A4 exemplified in FIG. 5 is described. For example, a case that the unit of an involvement degree which is given to the input text is an utterance unit and, the unit to which the topic involvement degree calculation unit 43 gives a topic involvement degree in step A4 exemplified in FIG. 5 is a word unit corresponds to this example. In this case, a unit to which a topic involvement degree is given is a part of a unit which is given to the input text. Therefore, in step A4 exemplified in FIG. 5, the topic involvement degree calculation unit 43 can use a value of a pertinent spot in the input text including a part to which a topic involvement degree is given (involvement degree) as the topic involvement degree.

For example, the topic involvement degree calculation unit 43 can make a topic involvement degree on the topic "procedure" of a part of a word "SAIKIDO ("reboot")" in speech text indicated by the speech index exemplified in FIG. 7 0.88 which is an involvement degree which is given to a part indicated by the speech index "16" at input time.

Next, a case in which the unit to which the topic involvement degree calculation unit 43 gives a topic involvement degree is longer than the unit of an involvement degree which is given to the input text in step A4 exemplified in FIG. 5 is described. For example, a case in which the unit of an involvement degree which is given to the input text is a word unit and, the unit to which the topic involvement degree calculation unit 43 gives a topic involvement degree is an utterance unit in step A4 exemplified in FIG. 5 corresponds to this example.

In this case, plural involvement degrees which are given to the input text exist for a unit to which a topic involvement degree is given. For example, in step A4 exemplified in FIG. 5, the topic involvement degree calculation unit 43 may calculate an average value on a part of a target to which the topic involvement degree is given based on the plural involvement degrees which are given to the input text and may set the average value as the topic involvement degree. For example, the topic involvement degree calculation unit 43 may make the topic involvement degree of a part indicated by the speech index "17" an average of nine values (involvement degree) of each word in speech text indicated by the speech index "17" which is given at the time of input "SHI ("done")", "TA ("having")", "KEDO ("in spite of")", ",", "UGOKA (imperfective form of "move")", "NAI ("not")", "DESU ("it does")", "NE (interjectional particle)", ".".

Further, the case in which the topic involvement degree is made an average value of the involvement degree which is given to the input text is described above. Otherwise, the topic involvement degree calculation unit 43 may choose the maximum value from the plural involvement degrees which are given to the input text on a part of a target to which the topic involvement degree is given, and may make the value the topic involvement degree. Or, the topic involvement degree calculation unit 43 may choose the minimum value from the plural involvement degrees which are given to the input text on a part of a target to which the topic involvement degree is given, and may make the value the topic involvement degree.

And, if the difference in importance exists in each part of the input text, for example, the topic involvement degree calculation unit 43 may employ a value which is given to an important part in plural values which are given to the input text on a part of a target to which the topic involvement degree is given (involvement degree) as the topic involvement degree.

For example, suppose that a value is given to the input text in a word unit and the topic involvement degree is given in an utterance unit in step A4 exemplified in FIG. 5. Here, if "independent word" indicating a type of a word is more important than "ancillary word", the topic involvement degree calculation unit 43 may employ not the value given to the ancillary word, but the value given to the independent word.

And, suppose that a value is given to the input text in a segment unit and the topic involvement degree is given in a sentence unit in step A4 exemplified in FIG. 5. Here, if "principal clause" indicating a type of a segment is more important than "conditional clause", the topic involvement degree calculation unit 43 may employ not the value given to the conditional clause, but the value given to the principal clause.

Next, a method is described, in which the topic involvement degree calculation unit 43 calculates the topic involvement degree having a positive correlation with the analysis target topic (that is the higher a degree of involvement with the analysis target topic is, the larger it becomes), when an involvement degree on the analysis target topic is not given to the input text, or when, even though an involvement degree on the analysis target topic is given to the input text, the involvement degree is not used. However, the topic involvement degree calculation unit 43 may calculate the topic involvement degree having a negative correlation with the analysis target topic (that is the higher a degree of involvement with the analysis target topic is, the smaller it becomes). When calculating the topic involvement degree having a negative correlation, for example, the topic involvement degree calculation unit 43 may calculate the topic involvement degree having a positive correlation with the analysis target topic by below method and after that may make the reciprocal number of the topic involvement degree the topic involvement degree having a negative correlation.

When calculating the topic involvement degree having a positive correlation, for example, the topic involvement degree calculation unit 43 may provide each utterance in the input text set with the topic involvement degree using a model which is preliminarily made and estimates whether or not an input spot is the analysis target topic. Further, this model may be arranged as a model to be used by the topic involvement degree calculation unit 43 in advance, and may be a model which the analysis setting input unit 20 receives. Hereafter, a case in which the topic involvement degree calculation unit 43 calculates confidence using the model in which the higher confidence is calculated as a probability of being the analysis target topic becomes higher, and calculates the topic involvement degree based on the calculated confidence is described below.

This model is generated, for example, based on learning by employing learning algorithm, like a simple Bayes method, decision tree learning, a maximum entropy method, or a support vector machine as a positive example which is an utterance corresponding to the analysis target topic (for example, topic "procedure") and a negative example which is an utterance corresponding to a topic other than the analysis target topic. The method for generating a model estimating whether or not an input spot corresponds to a positive example (it is a analysis target topic) by using these algorithm, and the method for calculating confidence in which an input spot corresponds to a positive example (it is a analysis target topic) by using the generated model are well known, and therefore descriptions thereon are omitted here.

Figure 13:
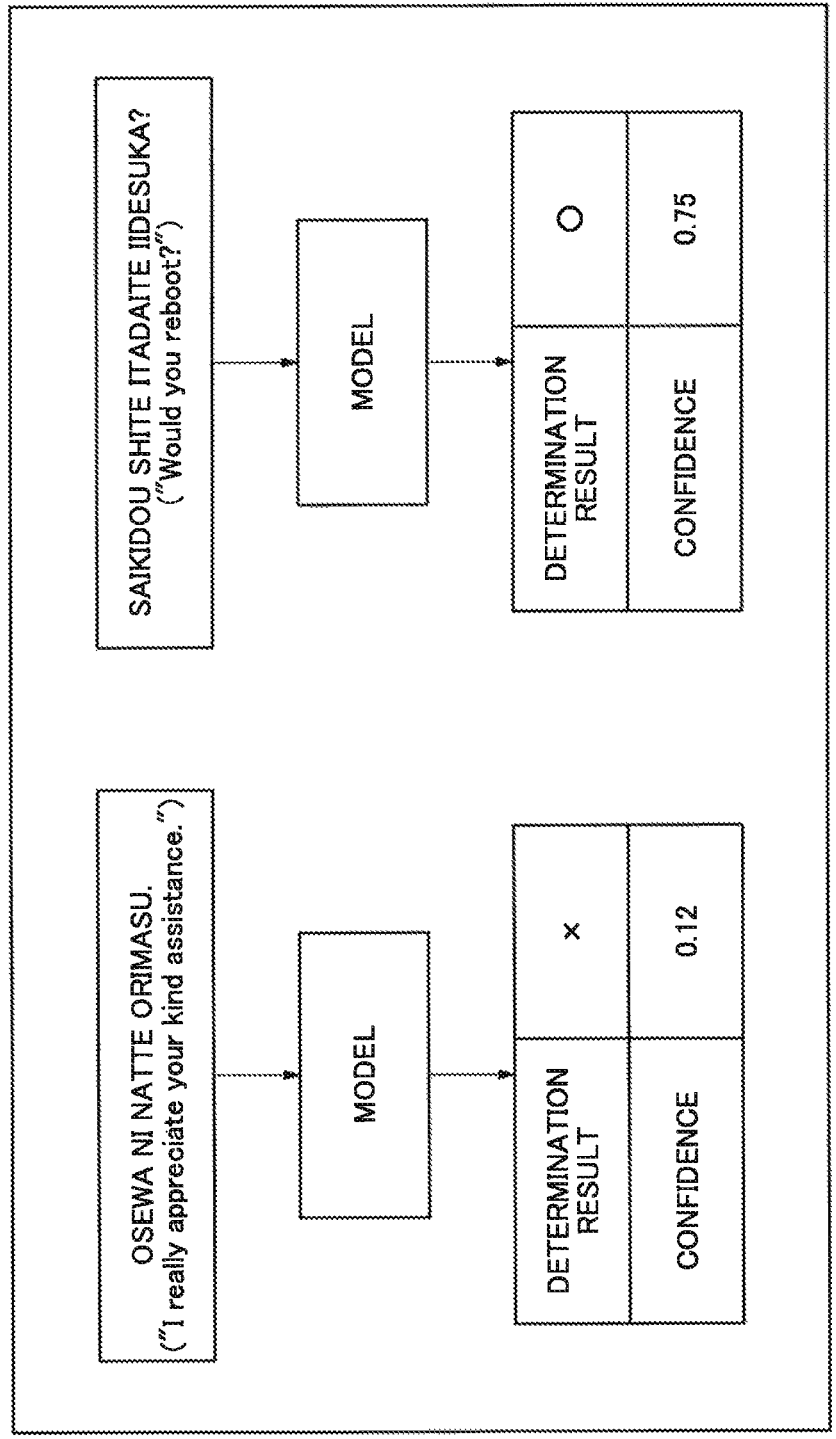
FIG. 13 An explanatory diagram illustrating an example of processing performed by a model.

FIG. 13 is an explanatory diagram illustrating an example of processing which the model generated using the above method performs. The model exemplified in FIG. 13 outputs a determination result representing whether or not an inputted utterance is the analysis target topic to the inputted utterance and confidence in which the utterance used for the determination is the analysis target topic. The confidence is a value which becomes higher as the probability that the input part is the analysis target topic becomes higher. Namely, the confidence may not be the probability of being the analysis target topic or a value from 0 to 1.

As a model estimating whether or not the input spot is the analysis target topic, for example, probability that an utterance becomes the analysis target topic may be derived using the model which is learned and generated using the simple Bayes method. When using the model generated by the simple Bayes method, the topic involvement degree calculation unit 43 calculates a probability (hereinafter, the probability is described as P (b|a)) that a topic of the utterance a becomes an analysis target topic b when utterance a is given as an input, and determines whether to be the analysis target topic. Further, in this case, confidence in which an input utterance is the analysis target topic may be set as probability P (b|a).

A method of giving the topic involvement degree using the above model is described. The topic involvement degree calculation unit 43 initially calculates confidence of each utterance which is a target which the topic involvement degree is given to using the above model. Then, the topic involvement degree calculation unit 43 regards the calculated confidence as the topic involvement degree, and provides each utterance with the topic involvement degree.

For example, suppose that a result of applying "OSEWA NI NATTE ORIMASU. (Meaning: "I really appreciate your kind assistance.")" exemplified in FIG. 13 (speech text indicated by the speech index "2" exemplified in FIG. 7) to the model is "confidence 0.12". In this case, the topic involvement degree of the speech text indicated by the speech index "2" is 0.12. Similarly, suppose that a result of applying "SAIKIDO SHITE ITADAITE II DESUKA? (Meaning: "Would you reboot?")" exemplified in FIG. 13 (speech text indicated by the speech index "16" exemplified in FIG. 7) to the model is "confidence 0.75". In this case, the topic involvement degree of the speech text indicated by the speech index "16" is 0.75.

Further, in the above descriptions, the case in which the confidence calculated by the topic involvement degree calculation unit 43 is regarded as the topic involvement degree is described. Otherwise, the topic involvement degree calculation unit 43 may preliminarily determine a threshold value on confidence for determining whether or not the input spot is the analysis target topic using manpower or a preliminary experiment, and may make the topic involvement degree zero when the confidence is equal to or less than the threshold value. For example, when the threshold value is determined to be 0.5 in the example shown in FIG. 13, the determination result is "X", and the topic involvement degree is zero since confidence of "OSEWA NI NATTE ORIMASU. (Meaning: "I really appreciate your kind assistance.")" is equal to or less than the threshold value. On the other hand, since confidence of "SAIKIDO SHITE ITADAITE II DESUKA? (Meaning: "Would you reboot?")" is more than the threshold value, the determination result is "O", and the topic involvement degree is 0.75.

And, the topic involvement degree calculation unit 43 may calculate so as to reduce the topic involvement degree of each utterance as each utterance much corresponds to a topic other than the analysis target topic. Hereafter, an example of a method, in which the topic involvement degree of each utterance is calculated to be reduced as each utterance much corresponds to a topic other than the analysis target topic, is described. Further, here, a case in which the topic exemplified in FIG. 7 is given to each utterance (speech text) and the analysis target topic is "procedure" is exemplified.

Initially, a default value of the topic involvement degree in case that a topic including an utterance is only one analysis target topic is set in advance using manpower or a preliminary experiment. And, when each utterance does not correspond to the analysis target topic, the topic involvement degree of the utterance is zero, and when each utterance corresponds to the analysis target topic, the value is obtained by dividing the above default value by the number of topics to which the utterance corresponds.

In this case, when describing an utterance as ut, a topic involvement of the utterance ut as Topic_Degree(ut), the number of topics to which the utterance ut corresponds as topic (ut), and a default value of the topic involvement degree as Default, and if the utterance ut corresponds to the analysis target topic, the topic involvement degree Topic_Degree (ut) of the utterance ut can be calculated by the formula 1 exemplified below.

$$\text{Topic\_Degree(ut)} = \text{Default}/f(\text{topic(ut)}) \quad \text{(Formula 1)}$$

Here, f (x) is a function which satisfies f (x)=x.

For example, when a default value (Default) is 1, the part indicated by the speech index "2" exemplified in FIG. 7 does not corresponds to the analysis target topic "procedure". Therefore, the topic involvement degree of the part indicated by the speech index "2" exemplified in FIG. 7 becomes zero. On the other hand, the topic involvement degree of the part indicated by the speech index "16" is 1 (=1/1), and the topic involvement degree of the part indicated by the speech index "20" is 0.5 (=½).

Further, the default value may not be a predetermined constant number, but may be confidence outputted by the above model (model which is preliminarily made and estimates whether or not an input spot is the analysis target topic).

And, a degree of influence on the topic involvement degree may be changed depending on the number of topics to which an utterance corresponds. Namely, a broad monotone increasing function except f (x)=x may be employed as a function f (x) used in the formula 1. Here, the broad monotone increasing function is a function in which if a<b, constantly f(a)≤f(b), with respect to arbitrary elements a, b in domain of f (x). For example, when a degree of influence on the topic involvement degree is made increased and the topic involvement degree is made decreased as the number of topics increases, a convex function, like $f(x)=x^2$ may be employed as the formula 1. And, for example, when influence on the topic involvement degree in a case that the number of topics changes from one to more than one is highly considered and influence on the topic involvement degree in a case of increase of the number of topics is made decreased, as the number of topics increases, a concave function exemplified in the following formula 2 may be employed as the formula 1.

$$f(x) = \sqrt{x} \quad \text{(formula 2)}$$

And, the topic involvement degree calculation unit 43 may calculate the topic involvement degree of each utterance utilizing closeness to a transition boundary of a topic. This utilizes that as the transition boundary of a topic get closer, it is likely to become a bridge between topics. Therefore, the topic involvement degree calculation unit 43 may calculate, in consideration that as it gets closer to the transition boundary of a topic it is likely to become a bridge between topics, so as to decrease a degree of involvement in a specific topic (topic involvement degree) as it gets closer to the transition boundary of a topic.

Here, the topic involvement degree Topic_Degree (ut) of an utterance ut is zero when the utterance ut does not correspond to the analysis target topic, and is calculated using the formula 3 exemplified below when the utterance corresponds thereto.

$$\text{Topic\_Degree(ut)} = \text{Default} * g(\text{dis(ut)}) \quad \text{formula (3)}$$

Here, Topic_Degree (ut) and Default used in the formula 3 are the same contents as that of the formula 1. And, the dis (ut) represents a distance between the utterance ut and the topic transition boundary which is the most closest to the utterance. The function g (x) is a broad monotonous increasing function and can employ any function which is the broad monotonous increasing function. For example, if g (x)=1−1/(1+x), the topic involvement degree calculation unit 43 can calculate Topic_Degree (ut) using the formula 4 exemplified below when the utterance ut corresponds to the analysis target topic.

$$\text{Topic\_Degree(ut)} = \text{Default} * [1 - 1/(1 + \text{dis(ut)})] \quad \text{formula (4)}$$

Here, suppose that the closest topic transition boundary to an utterance is a boundary A. At this time, for example, dis(ut) can be defined as the number of utterances which exist between the utterance ut and the topic boundary A including the utterance ut. For example, if Default=1 and the defined dis (ut) is used, a part indicated by the speech index "2" exemplified in FIG. 7 does not correspond to the analysis target topic "procedure". Therefore, the topic involvement degree of the part indicated by the speech index "2" exemplified in FIG. 7 becomes zero. On the other hand, the topic involvement degree of the part indicated by the speech index "18" is 0.75 (=1*(1−1/(1+3))), and the topic involvement degree of the part indicated by the speech index "20" is 0.5 (=1*(1−1/(1+1))).

Further, in the above descriptions, dis(ut) is defined as the number of utterances which exist between the utterance ut and the topic boundary A including the utterance ut. For example, dis(ut) may be the number of words which exist between the utterance ut and the boundary A including the utterance ut.

On the other hand, the topic involvement degree calculation unit 43 may calculate the topic involvement degree utilizing the characteristics that if a distance from the closet topic transition boundary exceeds a given distance, it does not become a bridge of topics. Here, suppose that in the formula 3, as the function g (x), a function is used, which is a broad monotonous increasing function, and in which if 0≤x, 0≤g (x)≤1 on an arbitrary element x in a domain of the g (x) (formula 4 is an example of a formula which satisfies the condition). And, a threshold vale for determining whether a distance exceeds a given distance is preliminarily determined based on manpower or a preliminary experiment. In this case, the topic involvement degree Topic_Degree (ut) of the utterance ut is calculated to be zero when the utterance ut does not correspond to the analysis target topic. The topic involvement degree Topic_Degree (ut) becomes Default when the utterance ut corresponds to the analysis target topic and the dis (ut) is equal to or more than the threshold value. And, the topic involvement degree Topic_Degree (ut) is calculated using the formula 4 when the utterance ut corresponds to the analysis target topic and the dis (ut) is less than the threshold value.

For example, when Default=1, g (x)=1−1/(1+x), and the threshold value is 2, the part indicated by the speech index "2" exemplified in FIG. 7 does not correspond to the analysis target topic "procedure". Therefore, the topic involvement degree of the speech text indicated by the speech index "2" becomes zero. And, the topic involvement degree of the speech text indicated by the speech index "18" becomes 1, that is the default value, since a distance from the topic transition boundary closest to the speech index "18" is 3 (equal to or more than the threshold value). And, the topic involvement degree of the speech indicated by the speech index "20" is calculated to be 0.5 (=1*(1−1/(1+1))) using the formula 4, since a distance from the topic transition boundary closest to the speech index "20" is 1 (less than the threshold value).

And, the topic involvement degree calculation unit 43 may calculate the topic involvement degree of each utterance using the number of topics other than the analysis target topic which each utterance corresponds to and closeness to the topic transition boundary. Concretely, for example, the topic involvement degree calculation unit 43 may make the topic involvement degree zero when each utterance does not correspond to the analysis target topic. The topic involvement degree calculation unit 43 may calculate the topic involvement degree using the formula 5 exemplified below which is the combination of the formula 1 and the formula 3 when each utterance corresponds to the analysis target topic. Further, the each variable (item) used in the formula 5 exemplified below has the same contents as those of descriptions on the formula 1 and the formula 3.

$$\text{Topic\_Degree}(ut) = \text{Default} * g(dis(ut)) / f(topic(ut)) \quad \text{formula (5)}$$

The method for calculating the topic involvement degree in step A4 exemplified in FIG. 5 is described above. Further, the calculation method used by the topic involvement degree calculation unit 43 and various setting information, like a function, a threshold value, a parameter, and the like which are used in the calculation method may be determined in advance. Or, the analysis setting input unit 20 may receive the calculation method and the various setting information from a user in step A2.

Further, when an analysis is conducted using the method exemplified in the analysis (2), the topic involvement degree calculation unit 43 may calculate the topic involvement degree indicating a degree to which each part of each text in the input text set gets involved in a topic other than the analysis target topic (that is other topic involvement degree) and give it to the each part. The topic involvement degree calculation unit 43 may use the method same as the calculation method for the topic involvement degree described above as the method of calculating other topic involvement degree.

The above processing corresponds to the processing to step A4 exemplified in FIG. 5.

Next, the topic involvement degree correction feature degree calculation unit 44 receives information on the analysis target topic and the text set of interest designated by the user through the analysis management unit 41 in step A2 exemplified in FIG. 5. Then, the topic involvement degree correction feature degree calculation unit 44 corrects the feature degree on the text set of interest with respect to each element generated in step A3 depending on the topic involvement degree calculated in step A4 exemplified in FIG. 5.

Further, when analysis is conducted by the method exemplified in the analysis (2), the topic involvement degree correction feature degree calculation unit 44 may correct the feature degree of each element using other topic involvement degree calculated in step A4 exemplified in FIG. 5.

Hereafter, processing which the appearance degree calculation unit 45 performs in step A5 exemplified in FIG. 5 and processing which the feature degree calculation unit 46 performs in step A6 are concretely described.

Initially, the appearance degree calculation unit 45 calculates an appearance degree (the appearance degree) to which each element generated in step A3 appears in a part corresponding to the analysis target topic. The appearance degree calculation unit 45 corrects the calculated appearance degree depending on the topic involvement degree calculated in step A4 exemplified in FIG. 5. This example is described using "the number of appearances" as an example of the appearance degree to which the appearance degree calculation unit 45 calculates and corrects. And, as an example of the correction method, the correction method for correcting the number of appearances on which each element appears in a part corresponding to the analysis target topic so as to increase as each element appears in a part where the topic involvement degree of the analysis target topic is high is described.

In this example, when an element appears once at each spot (part), the number of appearances at the spot is one. In a normal case where no correction is conducted, when an element appears once, the number of appearances is "1". Here, to correct means that the number of appearances in case that an element appears once is made "m (m is a real number) and recognizes m times appearances. In descriptions below, this correction is described as "to correct the number of appearances into m".

Initially, a case in which the topic involvement degree given in step A4 exemplified in FIG. 5 has positive correlation with the analysis target topic is described. In this case, the appearance degree calculation unit 45, for example, corrects the number of appearances of an element into a value given by multiplying the original number of appearances (the number of appearance before correction) by the topic involvement degree at the spot where the element appears. As a concrete example, initially, a case in which the unit of the element is the same as the unit to which the topic involvement degree is given in step A4 or a case in which the unit of the element is shorter than that are described. In this case, the appearance degree calculation unit 45 corrects the number of appearances of the element into a value given by multiplying the number by the topic involvement degree at the spot in which the element is included.

For example, suppose that the topic involvement degree is provided in the utterance unit in step A4 exemplified in FIG. 5. And, suppose that the element is one which is formed by dividing the input text in the word unit. In a normal case without correction, for example, it is understood that "SHI-verb" exemplified in FIG. 9 appears once at a part indicated by the speech index "17". On the other hand, the appearance degree calculation unit 45 understands that it appears by the number of the value given by multiplying the original number of appearances, 1, by the topic involvement degree which is given to the part indicated by the speech index "17" (for example, 0.78=1*0.78).

Next, a case in which the unit of the element is longer than the unit to which the topic involvement degree is given in step A4 is described. In this case, plural topic involvement degrees which are given to a spot where the element appears exist. The appearance degree calculation unit 45, for example, may correct the number of appearances of the element into a value which is given by multiplying the original number of appearances by an average value of the plural topic involvement degrees which are given to a spot where the element appears.

For example, suppose that the topic involvement degree is provided in an utterance unit and the element is an utterance unit in step A4. At this time, the appearance degree calculation unit 45 corrects the number of appearances of the speech text indicated by the speech index "17" into a value which is given by multiplying the original number of appearances by an average value of the topic involvement degree which is given to nine words "SHI ("done")", "TA ("having")", "KEDO ("in spite of")", ",", "UGOKA (imperfective form of "move")", "NAI ("not")", "DESU ("it does")", "NE (interjectional particle)", "." in the speech text indicated by the speech index "17".

And, the appearance degree calculation unit 45 may correct the number of appearances of the element into a value which is given by multiplying the original number of appearances by the minimum value of the plural topic involvement degrees which are given to a spot where the element appears. Similarly, the appearance degree calculation unit 45 may correct the number of appearances of the element into a value which is given by multiplying the original number of appearances by the maximum value of the plural topic involvement degrees which are given to a spot where the element appears.

And, when each part to which the topic involvement degree is given in step A4 differs in importance, the appearance degree calculation unit 45 may focus only on the topic involvement degree which is given to an important part in the plural topic involvement degrees which are given to a spot where the element appears and may perform using the method described above.

For example, suppose that the topic involvement degree is provided in an utterance unit and the element is an utterance unit in step A4. At this time, the appearance degree calculation unit 45 may correct using not the topic involvement degree which is given to an ancillary word, but the topic involvement degree which is given to an independent word, in the topic involvement degree which is given to each word in the utterance. And, for example, suppose that the topic involvement degree is provided in a segment unit and the element is a sentence unit in step A4. At this time, the appearance degree calculation unit 45 may correct using not the topic involvement degree which is given to a conditional clause, but the topic involvement degree which is given to a principal clause, in the topic involvement degree which is given to each segment in the sentence.

Hereafter, an example of a correction method is described. Further, a case in which a unit to which the topic involvement degree is given is different from a unit of the element may be corrected using the above method.

For example, the appearance degree calculation unit 45 may arrange a threshold value used for determining whether to correct the number of appearances of an element based on manpower or a preliminary experiment in advance. In this time, when the topic involvement degree in a spot where an element appears is equal to or more than the threshold value, the appearance degree calculation unit 45 may make the number of appearances of the element a value of the original number of appearances (for example, "1"). Or, the appearance degree calculation unit 45 may correct the topic involvement degree in a spot where an element appears into a value given by multiplying the original number of appearances by the topic involvement degree. Similarly, when the topic involvement degree in a spot where an element appears is less than the threshold value, the appearance degree calculation unit 45 may correct the number of appearances of the element into "0".

And, the appearance degree calculation unit 45 may correct the number of appearances of the element into a value which is given by multiplying the original number of appearances by a value given by discretely changing the topic involvement degree in a spot where an element appears. For example, the appearance degree calculation unit 45 may use the rule like "if m≤topic involvement degree<n than topic involvement degree=k (k, m, n are all real number)" which is preliminarily arranged by using manpower or the like, as a method of discretely changing the topic involvement degree. Or, the appearance degree calculation unit 45 may discretely change the topic involvement degree using the plural rules above described.

Or, when a value of the number of appearances corrected by using the correction method described above is not in the range from 0 to 1, the appearance degree calculation unit 45 may correct the number of appearances of the element into a value given by normalizing the vale into anywhere from 0 to 1. For example, when the corrected number of appearances is a negative value, the appearance degree calculation unit 45 adds an absolute value of the minimum number of appearance to all the number of appearances to make all the appearances equal to or more than zero. Then, the appearance degree calculation unit 45 normalizes the value of the number of appearances from 0 to 1 by dividing all the number of appearances by the value of the maximum number of appearances.

Next, a case in which the topic involvement degree given in step A4 exemplified in FIG. 5 has negative correlation with the analysis target topic is described. In this case, the appearance degree calculation unit 45, for example, corrects the number appearances of the element into a value given by multiplying the original number of appearances by the reciprocal number of the topic involvement degree at the spot where the element appears.

Further, in step A5 exemplified in FIG. 5, various setting information of a correction method performed by the appearance degree calculation unit 45, a threshold value used at the time of correction or the like, may be arranged in advance. Or, the analysis setting input unit 20 may receive the correction method and the various setting information from a user.

And, suppose a case in which an analysis is performed using the method exemplified in the analysis (2) in step A5 exemplified in FIG. 5. In this case, the appearance degree calculation unit 45 may correct the number of appearances at the spot corresponding to a topic other than the analysis target topic of each element depending on the other topic involvement degree calculated in step A4 exemplified in FIG. 5. The correction method of the number of appearances of the element which appears in a part corresponding to the topic other than the analysis target topic is the same as the correction method of the number of appearances of each element which appears in a part corresponding to the analysis target topic described above.

Further, the example that "the number of appearances" is used as an appearance degree to be corrected and calculated is described up to here. However, another appearance degree (for example "appearance confidence") may be used as an appearance degree to be corrected and calculated. In this case, the appearance degree of each element can be corrected in the same way of the correction method described above. In other words, when another appearance degree is used as the appearance degree, "the number of appearances" in the correction method described above just has to be replaced with "another appearance degree (for example "appearance confidence").

Further, the above processing corresponds to processing to step A5 exemplified in FIG. 5.

Next, the feature degree calculation unit 46 calculates the feature degree of each element on the text set of interest "text set served by the operator A" using the number of appearances after correction calculated by the appearance degree calculation unit 45 in step A5 exemplified in FIG. 5.

When analysis is performed, for example, by the method exemplified in the analysis (1) (that is method in which when the feature degree is calculated, only the part corresponding to the analysis target topic is used) in step A6 exemplified in FIG. 5, the feature degree calculation unit 46 just has to use only the number of appearances which appear in the part corresponding to the analysis target topic of each element in the number of appearance corrected by the appearance degree calculation unit 45 in step A5.

On the other hand, analysis may be performed by the method exemplified in the analysis (2) (that is method in which when the feature degree is calculated, the part corresponding to the analysis target topic and the part corresponding to the topic other than the analysis target topic are used). In this case, the feature degree calculation unit 46 just has to use the number of appearances in the part corresponding to the analysis target topic of each element and the number of appearances in the part corresponding to the topic other than the analysis target topic in the number of appearance corrected by the appearance degree calculation unit 45 in step A5, for calculation of the feature degree.

The index and the calculation method which are used when the feature degree is calculated are the same as the index and the calculation method which are used for general text mining. For example, the feature degree calculation unit 46 may use appearance frequency, a Chi-square value, SC, ESC, or the like as the index of the feature degree.

And, there is a case that although a value of the number of appearances corrected in step A5 exemplified in FIG. 5 is not normalized from 0 to 1, when an index of the feature degree is calculated in step A6 exemplified in FIG. 5, it is assumed that the range of the value which can be taken as the number of appearances is equal to or less than 1. In this case, the feature degree calculation unit 46 just has to normalize the number of appearances corrected in step A5 exemplified in FIG. 5 into a value from 0 to 1, and calculate the feature degree using the value after the normalization. The feature degree calculation unit 46 may use, for example, the method by which the appearance degree calculation unit 45 normalizes the number of appearances in step A5 exemplified in FIG. 5 as a method of normalizing the number of appearances.

Further, in step A6 exemplified in FIG. 5, various setting information of a calculation method performed by the feature degree calculation unit 46, an index of the feature degree, or the like may be arranged in advance. Or, the analysis setting input unit 20 may receive the calculation method and the various setting information from a user.

Further, the above processing corresponds to processing to step A6 exemplified in FIG. 5.

The output unit 30 finally outputs a distinctive element of the text set of interest "text set served by the operator A" based on the feature degree calculated in step A6 exemplified in FIG. 5. For example, the output unit 30 may determine that an element, the feature degree of which becomes equal to or more than the threshold vale set by manpower in advance, is the distinctive element and output the element. Otherwise, the output unit 30 may rearrange the elements in order with the high feature degree and determine that higher n elements (n is a value predetermined by a user or the like) are distinctive elements.

Figures 14, 15, 16:
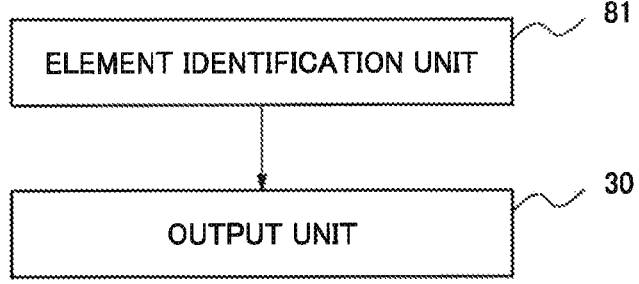
FIG. 14 An explanatory diagram illustrating an example of an output outputted from an output unit 30.
FIG. 15 An explanatory diagram illustrating an example of an output outputted from an output unit 30.
FIG. 16 A block diagram illustrating a minimum configuration of the text mining device of the present invention.

FIG. 14 and FIG. 15 are explanatory diagrams illustrating an example of output outputted by the output unit 30. The output unit 30, for example, may output only element determined to be distinctive as exemplified in FIG. 14 and may output a combination of the element determined to be distinctive and the feature degree of the element as exemplified in FIG. 15.

And, the output unit 30 may output not only the element determined to be distinctive, but also a combination of the elements and the feature degrees on all the elements generated by the language processing unit 42 in step A3 exemplified in FIG. 5. And, the output unit 30 may output the feature degree in the outputting order which is rearranged according to the feature degree, or may output regardless of the feature degree (that is without rearrangement).

Further, in step A7 exemplified in FIG. 5, various setting information of a method by which the output unit 30 outputs, a threshold value and variables used at the time of output, or the like may be arranged in advance. The analysis setting input unit 20 may receive the output method or the various setting information from a user.

Further, the above processing corresponds to processing to step A7 exemplified in FIG. 5.

Further, in step A2 exemplified in FIG. 5, the analysis setting input unit 20 may receive an instruction to repeat processing for each analysis target designated as processing steps of text mining. In this case, the analysis management unit 41 receives the processing steps of text mining from the analysis setting input unit 20 and manages the language processing unit 42, the topic involvement degree calculation unit 43 and the topic involvement degree correction feature degree calculation unit 44 (for details, the appearance degree calculation unit 45 and the feature degree calculation unit 46), and each unit performs each processing according to the instructed processing steps.

Hereafter, a case in which a user conducts analysis targeting a telephone call between a client and an operator at a call center is exemplified and described. Suppose here that processing in which a user obtains the most distinctive word of the operator A limited to the part of topic "procedure" (hereinafter referred to as analysis B1) is preliminarily set. And, suppose that processing for obtaining the distinctive word of the text set including the most distinctive word obtained in the analysis B1 limited to the topic "contact method" after the analysis B1 (hereinafter referred to as analysis B2) is preliminarily set.

Initially, the analysis management unit 41 instructs the language processing unit 42 to perform the processing performed in step A3 exemplified in FIG. 5 on all the input text (telephone call text performed between a client and an operator at a call center). Concretely, the analysis management unit 41 instructs the language processing unit 42 to perform language processing on each text which is a target of text mining and generate an element.

Next, the analysis management unit 41 instructs the topic involvement degree calculation unit 43 and the appearance degree calculation unit 45 to perform the processing conducted in step A4 exemplified in FIG. 5 and the processing conducted in step A5 exemplified in FIG. 5 with considering the analysis target topic as "procedure". Concretely, the analysis management unit 41 instructs the topic involvement degree calculation unit 43 to calculate the topic involvement degree on the analysis target topic "procedure". And, the analysis management unit 41 instructs the appearance degree calculation unit 45 to calculate the appearance degree of each word which appears at the part corresponding to the analysis target topic "procedure" and correct the calculated appearance degree depending on the topic involvement degree.

Then, the analysis management unit 41 instructs the feature degree calculation unit 46 to perform the processing performed in step A6 exemplified in FIG. 5 with considering the text set of interest as "text set served by the operator A". Concretely, the analysis management unit 41 makes the feature degree calculation unit 46 calculate the feature degree on the text set of interest "text set served by the operator A" of each word. In this way, the analysis B1 is performed.

Next the analysis management unit 41 instructs the topic involvement degree calculation unit 43 and the appearance degree calculation unit 45 to perform the processing conducted in step A4 exemplified in FIG. 5 and the processing conducted in step A5 exemplified in FIG. 5, and makes them calculate the appearance degree of each word which appears at the part corresponding to the analysis target topic "contact method" with considering the analysis target topic as "contact method".

Then, the analysis management unit 41 instructs the feature degree calculation unit 46 to perform the processing performed in step A6 exemplified in FIG. 5 with considering the text set of interest as "text set including the most distinctive word of the operator A obtained in the analysis B1". In this way, the analysis B2 is performed.

Using that the input unit 20 receives these processing steps, an analyst can try text mining with changing an axis of the analysis.

Next, an effect based on the example is described. According to the example, in step A5 exemplified in FIG. 5, the appearance degree calculation unit 45 calculates the appearance degree to which each element in the input text appears at the part corresponding to the analysis target topic "procedure". The appearance degree calculation unit 45 corrects the appearance degree depending on the topic involvement degree which gets involved in the analysis target topic which is added to the utterance in which the element appears.

And, for example, the number of appearances of the element which appears at the part which is important for analysis of the topic "procedure" like the part indicated by the speech index "16" exemplified in FIG. 6, which gets deeply involved in the topic "procedure", based on the correction method described as processing corresponding to the step A5, is corrected so as to become large. On the other hand, the number of appearances of the element which appears at the part indicated by the speech index "20", which is not relatively important for analysis of the topic "procedure" and which is a bridge between topics, is corrected so as to become small.

Then, in step A6 exemplified in FIG. 5, the feature degree calculation unit 46 calculates the feature degree using the corrected value. Therefore, the feature degree calculation unit 46 can correct the feature degree of each element in the input text depending on a degree to which the part where the element appears gets involved in the analysis target topic "procedure". In other words, an analyst can perform text mining depending on a degree of involvement in the analysis target topic "procedure". Therefore, an analyst can perform text mining targeting the analysis target topic "procedure" accurately.

Next, the example of the minimum configuration of the text mining device of the present invention is described. FIG. 16 is a block diagram illustrating the minimum configuration of the text mining device of the present invention. The text mining device of the present invention includes an element identification unit 81 for calculating a feature degree that is an index for indicating a degree to which within a text set of interest that is a set of text that is to be analyzed an element of the text appears (for example, the topic involvement degree correction feature degree calculation unit 44), and an output unit 30 for identifying a distinctive element within the text set of interest on the basis of the calculated feature degree (for example, identifying the element with the higher feature degree in the feature degrees as a distinctive element).

The element identification unit 81 corrects the feature degree on the basis of a topic relatedness degree (for example, topic involvement degree) that is a value indicating a degree to which each text portion which is partitioned into predetermined units (for example, unit of utterance) relates to a analysis target topic which is the topic which is targeted for analysis (for example, calculating the feature degree on the basis of a more highly corrected appearance degree as the element appears at a part where the topic involvement degree is high). Based on the configuration, the text mining device of the present invention can accurately perform the text mining targeting the specific topic.

Further, when the element identification unit 81 calculates the appearance degree indicating a degree to which the element appears in the text portion corresponding to the analysis target topic (for example, calculates the appearance degree so that the appearance degree becomes larger as the element much appears) and calculates the feature degree, the element identification unit 81 may includes an appearance degree calculation unit (for example, appearance degree calculation unit 45) which corrects more highly the appearance degree as the element appears in the text portion where the topic relatedness degree (for example, topic involvement degree) is high, and a feature degree calculation unit (for example, a feature degree calculation unit 46) which calculates the feature degree using the corrected appearance degree (for example, calculating "SC", "ESC", "Chi-square value", or the like) and identifies a distinctive element within the text set of interest on the (for example, an element having the feature degree which is equal to or more than the threshold, or the higher n elements) basis of the feature degree calculated using the corrected appearance degree. Based on such configuration, the text mining device of the present invention can accurately perform the text mining targeting the specific topic.

Further, the program recording medium of the present invention just has to be a recording medium storing a program causing a computer to execute each operation described in the exemplary embodiment described above. The text mining device of the present invention may be achieved based on that CPU executes the program stored in the recording medium, like memory, HDD which is described as the storage unit 50.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-280588, filed on Dec. 10, 2009, the disclosure of which is incorporated herein in its entirety by reference.

INDUSTRIAL APPLICABILITY

The present invention is appropriately applicable when text mining is performed by targeting a specific topic. In particular, the present invention demonstrates the effect when each text of an input text set includes plural topics, and a part corresponding to the plural topics exist in the text. For example, the present invention demonstrates the effect when the text mining is performed to a text which is obtained by speech-recognizing a telephone call speech in a call center or transcribed text thereof as the set of input text by targeting a specific topic. Or, the present invention demonstrates the effect when the text mining is performed to a text which is obtained by speech-recognizing a conference speech or transcribed text thereof as the set of input text by targeting a specific topic. And, the present invention demonstrates the effect when the text mining is performed to a text which is obtained by speech-recognizing a conversation between a shop staff and a customer at a shop front or transcribed text thereof as the set of input text by targeting a specific topic. And, the present invention demonstrates the effect when the text mining is performed to set of BBS (Bulletin Board System: electronic bulletin board) on the web as the set of input text by targeting a specific topic.

DESCRIPTION OF SYMBOL

10 Data input unit
20 Analysis setting unit
30 Output unit
40 Computer
41 Analysis management unit 42 Language processing unit
43 Topic involvement degree calculation unit
44 Topic involvement degree correction feature degree calculation unit
45 Appearance degree calculation unit
46 Feature degree calculation unit
50 Storage unit

The invention claimed is:

1. A text mining device, comprising:
a computer device that includes a processing device, a memory readable by the processing device, and a storage unit readable by that processing device, the memory having stored program code sufficient to cause the computer device, upon execution by the processing device, to operate as:
   a data input unit that receives, as input, audible speech and converts said speech to an input text set intended to be a target of text mining;
   a language processing unit that performs language processing for one or more portions of the input text set and outputs and stores a plurality of text elements;
   a topic involvement degree calculation unit that calculates and stores a topic relatedness degree that indicates a degree to which each text element relates to an analysis target topic received by the user and stored; and
   an element identification unit that, for each text element,
      calculates and stores a topic involvement degree on the analysis target topic with respect to the text element,
      calculates and stores an appearance degree by counting a number of times the text element appears in the input text set, said appearance degree indicating a degree to which the text element appears in each portion of the input text set corresponding to the analysis target topic,
      corrects the calculated appearance degree of the text element by multiplying the calculated appearance degree with the topic involvement degree to produce and store a corrected appearance degree,
      calculates and stores, using the corrected appearance degree, a feature degree as an index of a degree to which the text element appears within the input text set, and
      using the feature degree, identifies, stores and outputs, via an output unit, a distinctive text element within the input text set on the basis of the calculated feature degree,
   wherein the feature degree is a degree that a word of the input text set, a word n-Gram, a segment, or dependency thereof, or n consecutive dependency thereof, or each element divided into a unit of a partial tree of a syntax tree, or any combination of the foregoing appears within the input text set, where n is a natural number.

2. The text mining device of claim 1, wherein said element identification unit causes a greater correction upon the appearance degree when the text element appearing in the input text set has a higher topic involvement degree.

3. The text mining device of claim 1, wherein said topic involvement degree calculation unit calculates a confidence indicating a confidence degree relating the text element to the analysis target topic on the basis of a model that estimates whether or not the text element is the analysis target topic, and calculates the confidence as the topic involvement degree.

4. The text mining device of claim 3, wherein said topic involvement degree calculation unit calculates the topic involvement degree so as to be smaller as the text element more highly corresponds to a topic other than the analysis target topic when calculating the topic involvement degree.

5. The text mining device of claim 3, wherein said topic involvement degree calculation unit calculates the topic involvement degree so as to be smaller, as closeness to a transition boundary of a topic of the text element when calculating the topic involvement degree.

6. The text mining device of claim 1, wherein said topic involvement degree calculation unit calculates the topic involvement degree so as to be smaller as the text element more highly corresponds to a topic other than the analysis target topic when calculating the topic involvement degree.

7. The text mining device of claim 6, wherein said topic involvement degree calculation unit calculates the topic involvement degree so as to be smaller, as closeness to a transition boundary of a topic of the text element when calculating the topic involvement degree.

8. The text mining device of claim 1, wherein said topic involvement degree calculation unit calculates the topic involvement degree so as to be smaller, as closeness to a transition boundary of a topic of the text element when calculating the topic involvement degree.

9. The text mining device of claim 1, wherein said element identification unit calculates the feature degree as an index indicating frequency or deviation at which the text element appears in the input text set.

10. A text mining method, implemented by a computing machine with a processing device and an information storage device that stores instructions for operating the processing device, for analyzing text input to the computing machine, the method comprising:
   receiving, as input, audible speech, and converting and storing said speech as an input text set intended to be a target of text mining;
   performing language processing upon the input text set to generate and store a plurality of text elements;
   receiving and storing an analysis target topic; and
   for each text element,
      calculating and storing a topic involvement degree that indicates a degree to which the text element relates to the analysis target topic,
      calculating and storing an appearance degree as a number of times the text element appears in each corresponding part of the analysis target topic,
      using the topic involvement degree of the text element to correct the stored calculated appearance degree of the text element by multiplying the calculated appearance degree with the topic involvement degree to produce a corrected appearance degree,
      using the corrected appearance degree to calculate and store a feature degree of the text element on the input text set, the feature degree indicating a degree to which the text element appears within the input text set, and
      using the feature degree to identify, store, and output via an output unit, a distinctive text element within the input text set.

11. A non-transitory computer readable medium for analyzing text input to a computing machine having recorded thereon a program, said program operatively configured to cause, upon execution by a processing device of the computing machine, the computing machine to perform a method comprising the steps of:
   receiving and storing, as input to the computing machine, an analysis target topic;

receiving audible speech, and converting and storing said audible speech as a target text set as input to the computing machine, and dividing said target text set into text elements for analysis; and for each text element, calculating and storing a topic involvement degree that indicates a degree to which the element relates to the analysis target topic;

calculating and storing an appearance degree as a number of times the text element appears in each corresponding part of the analysis target topic;

using the topic involvement degree of the text element to correct the stored calculated appearance degree of the text element by multiplying the calculated appearance degree with the topic involvement degree to produce a corrected appearance degree;

using the corrected appearance degree to calculate and store a feature degree as an index that indicates a degree to which the text element appears within the target text set;

identifying and storing, by using the feature degree, a distinctive element within the target text set; and outputting, via an output unit, the identified distinctive element.

12. A text mining device, comprising:

a computer device that includes a processing device, a memory readable by the processing device, and a storage unit readable by that processing device, the memory having stored program code sufficient to cause the computer device, upon execution by the processing device, to operate as:

a data input element that receives, as input, audible speech and converts said speech to an input text set intended to be a target of text mining;

a language processing element that performs language processing for one or more portions of the input text set and outputs and stores a plurality of text elements;

a topic involvement degree calculation element that calculates and stores a topic relatedness degree that indicates a degree to which each text element relates to an analysis target topic received and input from the user; and an element identification element that calculates and stores a topic involvement degree on the analysis target topic with respect to the text element, calculates and stores an appearance degree by counting a number of times the text element appears in the input text set, said appearance degree indicating a degree to which the text element appears in each portion of the input text corresponding to the analysis target topic, corrects, using the topic involvement degree of the text element, the calculated appearance degree of the text element by multiplying the calculated appearance degree with the topic involvement degree to produce and store a corrected appearance degree, calculates, using the corrected appearance degree, a feature degree as an index of a degree to which the text element appears within the input text set, and using the feature degree, identifies, stores, and outputs, via an output unit, a distinctive text element within the input text set on the basis of the calculated feature degree.

\* \* \* \* \*